US011468685B2

(12) United States Patent
Kato et al.

(10) Patent No.: US 11,468,685 B2
(45) Date of Patent: Oct. 11, 2022

(54) MONITOR DEVICE AND TROLLEY TYPE VEHICLE

(71) Applicant: Hitachi Construction Machinery Co., Ltd., Tokyo (JP)

(72) Inventors: Takushi Kato, Kasumigaura (JP); Naoki Tatsuzawa, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 440 days.

(21) Appl. No.: 16/646,403

(22) PCT Filed: Mar. 8, 2019

(86) PCT No.: PCT/JP2019/009340
§ 371 (c)(1),
(2) Date: Mar. 11, 2020

(87) PCT Pub. No.: WO2019/181563
PCT Pub. Date: Sep. 26, 2019

(65) Prior Publication Data
US 2020/0285861 A1    Sep. 10, 2020

(30) Foreign Application Priority Data
Mar. 19, 2018 (JP) .............................. JP2018-051295

(51) Int. Cl.
*H04N 5/225* (2006.01)
*G06V 20/56* (2022.01)
(Continued)

(52) U.S. Cl.
CPC ................ *G06V 20/56* (2022.01); *B60L 5/08* (2013.01); *B60M 1/12* (2013.01); *B60M 7/00* (2013.01);
(Continued)

(58) Field of Classification Search
CPC ........ G06V 20/56; G06V 10/141; B60L 5/08; B60M 1/12; B60M 7/00; H04N 5/2253; H04N 5/2256; H04N 5/2351; H04N 7/18
See application file for complete search history.

(56) References Cited

U.S. PATENT DOCUMENTS 5,999,877 A * 12/1999 Takahashi .............. G06V 20/54
340/916
8,204,305 B2 * 6/2012 Zou ........................ G06V 20/56
382/104
(Continued)

FOREIGN PATENT DOCUMENTS

JP      9-282452 A      10/1997
JP      2007-91141 A     4/2007
(Continued)

OTHER PUBLICATIONS

International Search Report (PCT/ISA/210) issued in PCT Application No. PCT/JP2019/009340 dated Jun. 4, 2019 with English translation (three (3) pages).
(Continued)

*Primary Examiner* — Jonathan R Messmore
(74) *Attorney, Agent, or Firm* — Crowell & Moring LLP

(57) ABSTRACT

A monitor device is provided with an imaging device that shoots an overhead line and a current collector, and a controller that processes an image. The controller includes a day or night determination processing section, and an image processing section that switches a parameter for recognizing the overhead line and the current collector in the image by executing image processing different in the daylight and at night based upon the result of the day or night determination. Further, there are provided reference photographic subjects to be shot by the imaging device in positions different from the overhead line and the current collector in an image area to be shot, and the day or night determination processing
(Continued)

section performs the determination of day or night based upon a luminance average value of the reference photographic subjects inputted into an image input section.

7 Claims, 18 Drawing Sheets

(51) Int. Cl.
  *B60L 5/08* (2006.01)
  *B60M 1/12* (2006.01)
  *B60M 7/00* (2006.01)
  *H04N 5/235* (2006.01)
  *H04N 7/18* (2006.01)
  *G06V 10/141* (2022.01)

(52) U.S. Cl.
  CPC ......... *G06V 10/141* (2022.01); *H04N 5/2253* (2013.01); *H04N 5/2256* (2013.01); *H04N 5/2351* (2013.01); *H04N 7/18* (2013.01)

(56) References Cited

U.S. PATENT DOCUMENTS

| | | | |
|---|---|---|---|
| 9,022,153 B2* | 5/2015 | Tojima | ................ B60L 3/0023 180/167 |
| 2014/0224609 A1 | 8/2014 | Saito et al. | |
| 2018/0013271 A1* | 1/2018 | Goulden | ................ H02G 3/04 |
| 2018/0017791 A1* | 1/2018 | Beckman | ........... H04N 5/23287 |

FOREIGN PATENT DOCUMENTS

| | | |
|---|---|---|
| JP | 2013-15429 A | 1/2013 |
| JP | 2016-115259 A | 6/2016 |

OTHER PUBLICATIONS

Japanese-language Written Opinion (PCT/ISA/237) issued in PCT Application No. PCT/JP2019/009340 dated Jun. 4, 2019 (three (3) pages).
Extended European Search Report issued in European Application No. 19770645.0 dated Mar. 24, 2021 (11 pages).

\* cited by examiner

MONITOR DEVICE AND TROLLEY TYPE VEHICLE

TECHNICAL FIELD

The present invention relates to a monitor device that recognizes an object from an image shot by an imaging device for image processing to monitor the object and a trolley type vehicle with the monitor device.

BACKGROUND ART

A monitor device used in the form of being mounted on a vehicle outdoors or the like is provided with an imaging device that shoots an object, and a controller that processes an image shot by the imaging device. The controller includes an image input section that receives input of the image shot by the imaging device, a day or night determination processing section that determines day or night of the image inputted into the image input section, and an image processing section that switches an image processing parameter for easily recognizing the object in the image by executing image processing different in the daylight and at night respectively based upon the result of the day or night determination determined by the day or night determination processing section. In this case, the day or night determination processing section performs the determination of day or night based upon a luminance level in the image shot by the imaging device to determine an imaging condition (for example, refer to Patent Document 1). In addition, there is described a trolley type transportation vehicle that mounts an imaging device thereon and detects a relative position between a pantograph and an overhead line (for example, refer to Patent Document 2).

PRIOR ART DOCUMENT

Patent Document

Patent Document 1: U.S. Pat. No. 8,204,305 B2
Patent Document 2: U.S. Pat. No. 9,022,153 B2

SUMMARY OF THE INVENTION

The aforementioned imaging device is provided with a camera with an imaging element generally pixelated with a semiconductor such as a CCD (Charge Coupled Device). An image signal in accordance with light and dark (a luminance level) of light inputted into a camera light-receiving part is outputted, but in an excessive light quantity, a so-called halation defect that an output signal is saturated is generated because of the characteristic of the imaging element, and in reverse, in a weak light quantity, a so-called black defect that an output signal is too small to determine a photographic subject tends to be easily generated. Therefore, almost all of cameras to be sold on the market have an AGC (Automatic Gain Control) circuit in advance housed therein, the AGC circuit outputting an image signal the luminance intensity (the width of light and dark) of which is adjusted within a constant range by increasing a gain when the light quantity is weak and decreasing the gain when the light quantity is excessive.

In a case where the aforementioned monitor device in the conventional technology is mounted on a vehicle (a mobile object) such as a dump truck, since the surrounding environment (the imaging environment) changes by such as not only a change in the weather or an elapse in time but also transfer from a flat ground to a valley side by travel of a vehicle, or reflection of street lamps at night, an luminance average value in a specific area in the shooting image largely varies. Following it, the AGC circuit automatically adjusts the luminance level in an entire image within a constant range, and therefore, in fact, the determination accuracy in the day or night determination possibly deteriorates.

In order to overcome this problem, in Patent Document 1 as described above a sky area and a ground area are in advance set in the image, and day or night is determined based upon a ratio in the pixel number showing a predetermined luminance value in each of the areas. However, in the trolley type transportation vehicle as disclosed in Patent Document 2, a monitoring object is the pantograph and therefore, it is impossible to set the ground area within the shooting image.

The present invention is made in view of the aforementioned problems in the conventional technology, and an object of the present invention is to provide a monitor device mounted on a trolley type vehicle that improves the determination accuracy in day or night determination of an imaging environment therein.

In order to solve the aforementioned problems, a monitor device according to the present invention includes: an imaging device that is mounted on a vehicle and shoots an object outside of the vehicle; a controller that processes an image shot by the imaging device; and a plurality of reference photographic subjects that are disposed to be fixed integrally with the imaging device and are shot by the imaging device in positions different from the object in an image area to be shot, characterized in that: wherein the controller includes: a day or night determination processing section that determines day or night in an imaging environment of the object; and an image processing section that switches an image processing parameter for recognizing the object in the image by executing image processing different in the daylight and at night based upon the result of the day or night determination determined by the day or night determination processing section, wherein the day or night determination processing section in the controller performs the determination of day or night based upon luminance information of the plurality of reference photographic subjects, and the image processing section in the controller executes the image processing using the image processing parameter different in the daylight and at night based upon the result of the day or night determination of the day or night determination processing section.

According to the present invention, it is possible to improve the determination accuracy in the day or night determination on the imaging environment to be performed in the monitor device.

BRIEF DESCRIPTION OF THE DRAWINGS

FIG. 3 is a perspective view showing the bracket, the imaging device provided with an illumination device, a left reference photographic subject, a right reference photographic subject and the like.

MODE FOR CARRYING OUT THE INVENTION

Hereinafter, an explanation will be made of a monitor device according to embodiments of the present invention with reference to the accompanying drawings by taking a case of being mounted on a trolley type dump truck as an example.

Figure 1:
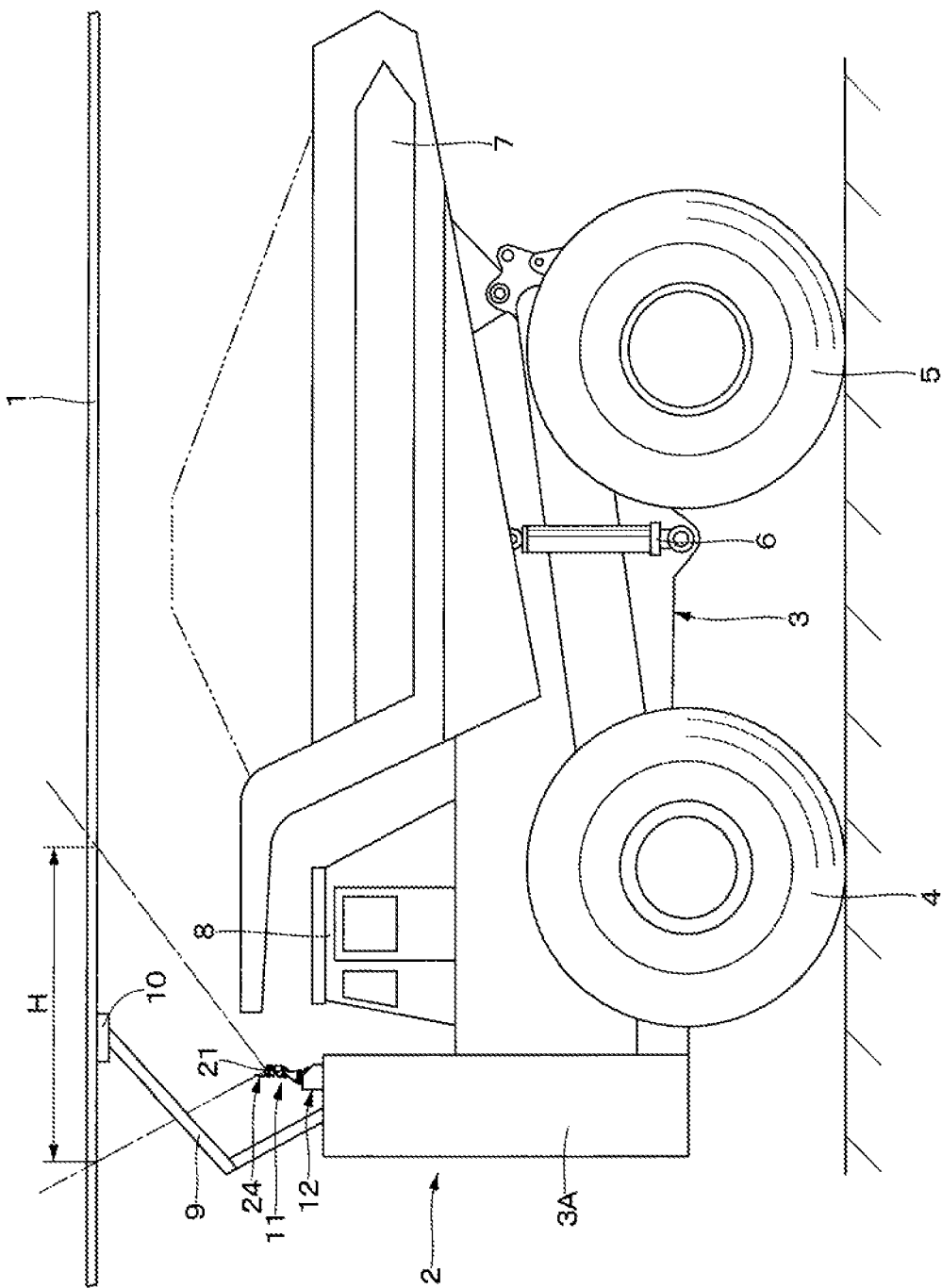
FIG. 1 is a front view showing a trolley type dump truck on which a monitor device is mounted according to a first embodiment of the present invention.

FIG. 1 to FIG. 13 show a first embodiment of the present invention. An overhead line 1 (a trolley line) as shown in FIG. 1 is stretched on a travel path (a traffic line) of a mine, for example, to supply power to a dump truck 2 as a large-sized transportation vehicle that is used for a transportation work of minerals and the like excavated in the mine. The dump truck 2 is configured to include a vehicle body 3 having left and right front wheels 4 and left and right rear wheels 5 driving by the power from the overhead line 1, and a loading platform 7 disposed on a backward upper part of the vehicle body 3 to be rotatable (capable of tilting) in a upper-lower direction by a hoist cylinder 6.

The vehicle body 3 is provided with a cab 8 that is positioned on the front side of the loading platform 7 and defines therein an operator's room in which an operator gets. An after-mentioned display device 39 is attached on the front side of an operator's seat in the cab 8. An after-mentioned controller 26 is disposed in the cab 8 to control (process) an image shot in an imaging device 21, which will be described herein after.

A pantograph 9 is attached on a top surface of a mount 3A disposed on the front side of the vehicle body 3. The pantograph 9 is disposed to be capable of moving up and down between the overhead line 1 and the mount 3A facing to each other and is provided with a current collector 10 on the upper end that makes sliding contact with the overhead line 1 to take in power. The dump truck 2 can drive a traveling motor (not shown) of the rear wheels 5 as drive wheels, for example, with supply of the power via the current collector 10 from the overhead line 1.

Next, an explanation will be made of a monitor device 11 mounted on the dump truck 2.

The monitor device 11 monitors a contact (sliding contact) state between the overhead line 1 and the current collector 10. That is, the monitor device 11 monitors a positional relation between the overhead line 1 and the current collector 10 such that the current collector 10 does not derail from the overhead line 1 at the traveling of the dump truck 2. In addition, the monitor device 11 is configured to include a bracket 12 on which the imaging device 21 is attached, the imaging device 21 that shoots the overhead line 1 and the current collector 10, reference photographic subjects 24 that are shot by the imaging device 21 in positions different from the overhead line 1 and the current collector 10 in an image area to be shot, and a controller 26 that processes an image that is shot by the imaging device 21.

Figure 2:
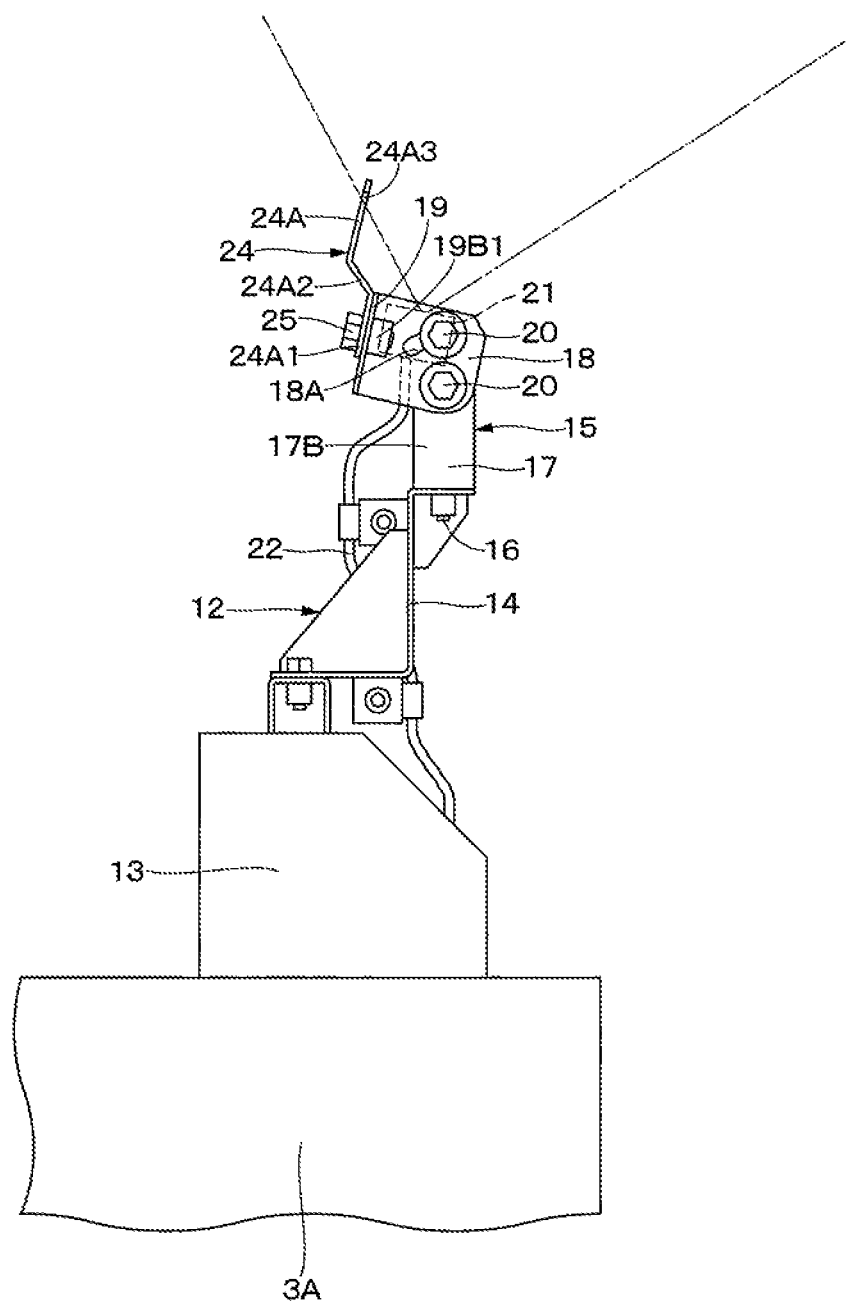
FIG. 2 is a partially enlarged front view showing a bracket, an imaging device and the like in FIG. 1.

The bracket 12 is disposed on the mount 3A of the vehicle body 3 to be positioned on the back side of the pantograph 9. As shown in FIG. 2, the bracket 12 is configured to include a base tool 13 that is fixed on the top surface side of the mount 3A by bolts (not shown), an intermediate attachment tool 14 that is fixed on the top surface of the base tool 13 by bolts or the like and on which a portion of an after-mentioned cable 22 along the path is attached, and an imaging device attachment tool 15 that is fixed on the top surface of the intermediate attachment tool 14 by bolts 16 and on which the after-mentioned imaging device 21 is attached.

Figure 3:
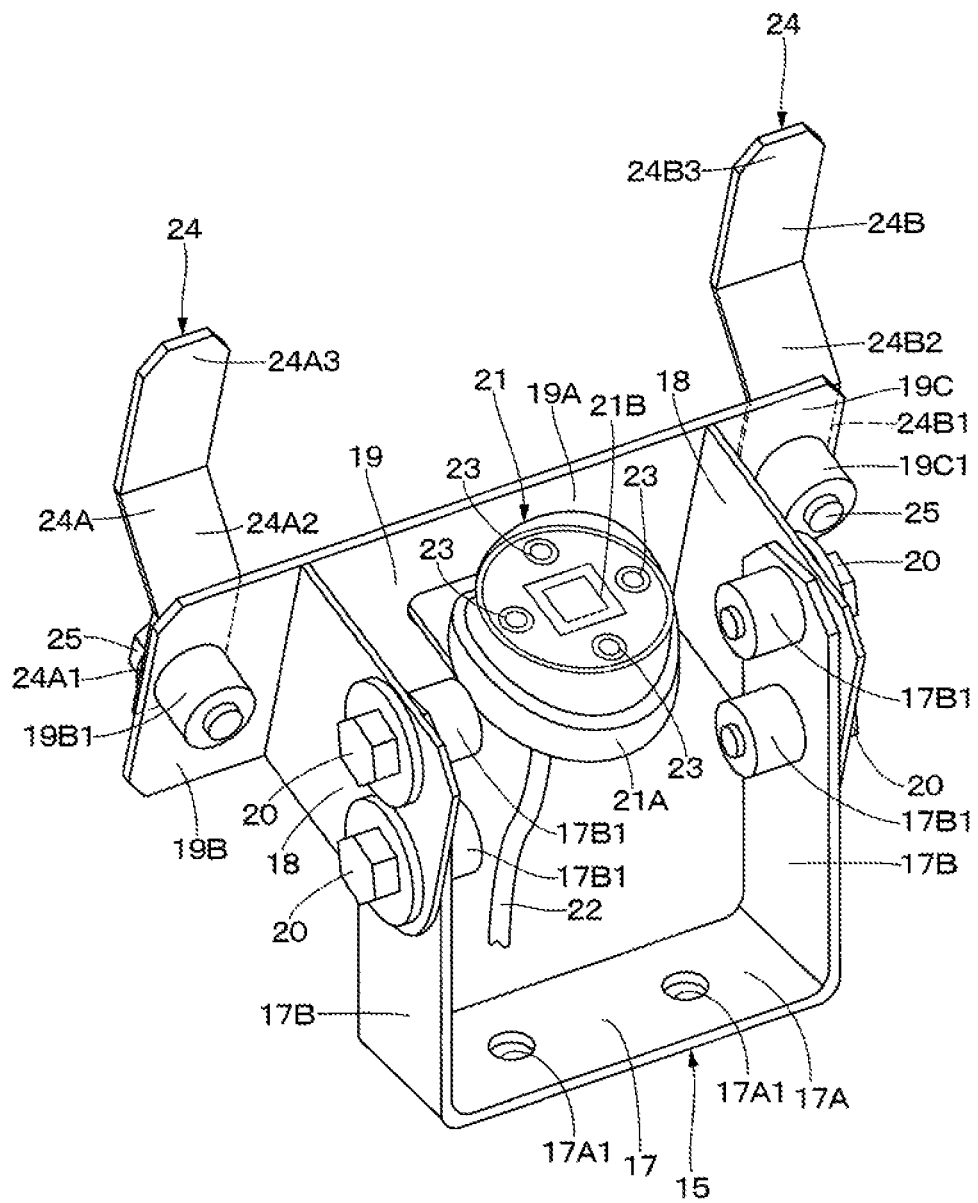

A shown in FIG. 3, the imaging device attachment tool 15 is configured of a seat 17 attached on the top surface of the intermediate attachment tool 14, angle adjustment plates 18 that extend toward the forward side from the upper end side of the seat 17 and an angle of which is adjustable to the seat 17, and an extension plate 19 that is fixed to the tip end sides of the angle adjustment plates 18 by welding or the like and extends in a left-right direction.

The seat 17 is configured of an attachment plate part 17A attached on the top surface of the intermediate attachment tool 14, and vertical plate parts 17B rising up toward the upward side from both of left and right ends of the attachment plate part 17A. Two bolt through holes 17A1 into which the bolts 16 are inserted are formed in the attachment plate part 17A as to be spaced in the left-right direction. The imaging device attachment tool 15 is attached to the intermediate attachment tool 14 by screwing the bolts 16 into screw holes of the intermediate attachment tool 14 through the bolt through holes 17A1. Two screw seats 17B1 are respectively disposed on the inner surface side of each of the vertical plate parts 17B as to be spaced in an upper-lower direction.

Bolt through holes 18A (shown in FIG. 2 only) are formed respectively in positions corresponding to the screw seats 17B1 of each of the vertical plate parts 17B on each of the angle adjustment plates 18. As a result, the angle adjustment plate 18 is attached on each of the vertical plate parts 17B by causing each of the bolts 20 to be inserted in each of the bolt through holes 18A to be screwed into each of the screw seats 17B1. In this case, as shown in FIG. 2, the bolt through hole 18A positioned on the upper side of the upper and lower bolt through holes 18A is formed in a curved long hole. Accordingly, the angle adjustment plate 18 can adjust an angle thereof to the attachment plate part 17A on a basis of the bolt 20 positioned on the lower side.

The extension plate 19 is fixed to the tip end side of each of the angle adjustment plates 18 by welding or the like and extends in the left-right direction. The extension plate 19 is configured to includes an imaging device fixing part 19A that is positioned between the left angle adjustment plate 18 and the right angle adjustment plate 18 and on which the after-mentioned imaging device 21 is fixed, a left reference photographic subject fixing part 19B that projects closer to the left side than the left angle adjustment plate 18 and on which an after-mentioned left reference photographic subject 24A is fixed together with the imaging device 21, and a right reference photographic subject fixing part 19C that projects closer to the right side than the right angle adjustment plate 18 and on which an after-mentioned right reference photographic subject 24B is fixed together with the imaging device 21.

A screw seat 19B1 is disposed on the rear surface of the left reference photographic subject fixing part 19B to attach the after-mentioned left reference photographic subject 24A thereto. Meanwhile, a screw seat 19C1 is disposed on the rear surface of the right reference photographic subject fixing part 19C to attach the after-mentioned right reference photographic subject 24B thereto. Positions of the screw seat 19B1 and the screw seat 19C1 are set such that the left reference photographic subject 24A and the right reference photographic subject 24B enter into both of left and right end sides in an image shot by a camera 21B in the imaging device 21 to be described later.

Next, an explanation will be made of the imaging device 21 attached to the imaging device attachment tool 15.

The imaging device 21 is mounted on the dump truck 2 (the vehicle). The imaging device 21 is fixed on the extension plate 19 to be positioned between the left and right angle adjustment plates 18 of the imaging device attachment tool 15. The imaging device 21 is configured to include a casing 21A that is fixed to the imaging device fixing part 19A of the extension plate 19, and the camera 21B that is disposed (housed) in the casing 21A. The camera 21B can shoot a shooting image by color, for example, and mounts thereon an AGC (Automatic Gain Control) circuit for automatically adjusting a gain in accordance with an image to be shot. That is, the camera 21B automatically adjusts the gain in accordance with the image to be shot.

As shown in FIG. 1, the camera 21B can accommodate the overhead line 1 and the current collector 10 within a shooting range H by moving each of the angle adjustment plates 18 in the upper-lower direction. That is, the overhead line 1 and the current collector 10 are arranged outside of the dump truck 2 (the vehicle) and configure objects, which are shot by the camera 21B in the imaging device 21, of the present invention. The camera 21B is connected to the after-mentioned controller 26 by the cable 22, and outputs the shot image toward the controller 26.

In addition, four illumination devices 23 are housed in the casing 21A around the camera 21B. The illumination devices 23 illuminate the overhead line 1, the current collector 10, and the after-mentioned reference photographic subjects 24. The camera 21B and the illumination devices 23 are connected to an unillustrated power source, and therefore, power is supplied to the camera 21B and the illumination devices 23 by an operator turning on key switches in the cab 8. That is, the camera 21B starts to shoot the overhead line 1, the current collector 10, and the after-mentioned reference photographic subjects 24 in response to the ON operation of the key switch.

In addition, the illumination device 23 starts the lighting regardless of day or night with an operation of turning on an illumination switch. The illumination device 23 performs the lighting or non-lighting by an operator, but, a lighting state of the illumination device 23 may be determined in association with a time set by a timer or in accordance with a luminance average value of an image. According to the present invention, it is basically possible to perform the day or night determination regardless of a combination of the lighting state of the illumination device 23 and the day or night of the imaging environment.

Next, an explanation will be made of the reference photographic subjects 24 attached on the extension plate 19 of the imaging device attachment tool 15.

The reference photographic subjects 24 are shot by the camera 21B in the imaging device 21 in the positions different from the overhead line 1 and the current collector 10 in the image area to be shot. That is, the reference photographic subjects 24 are arranged to be accommodated within the shooting range H in the positions not to interrupt the shooting of the overhead line 1 and the current collector 10. The reference photographic subjects 24 are used when an after-mentioned day or night determination processing section 29 in the controller 26 determines day or night. In addition, the reference photographic subjects 24 are configured of the left reference photographic subject 24A disposed in the left side (one side) in the left-right direction, and the right reference photographic subject 24B disposed in the right side (the other side) in the left-right direction. The left reference photographic subject 24A corresponds to a first reference photographic subject of the present invention, and the right reference photographic subject 24B corresponds to a second reference photographic subject of the present invention.

As shown in FIG. 2 and FIG. 3, the left reference photographic subject 24A is formed in a plate shape by a metallic material, a resin material or the like, and extends upward from the left reference photographic subject fixing part 19B of the imaging device attachment tool 15. The left reference photographic subject 24A is configured of a fixing part 24A1 fixed to the left reference photographic subject fixing part 19B, a bend part 24A2 bending from the top end to the forward side of the fixing part 24A1, and a shot imaging part 24A3 that extends from the tip end to the upward side of the bend part 24A2 and is shot by the camera 21B.

Figure 10:
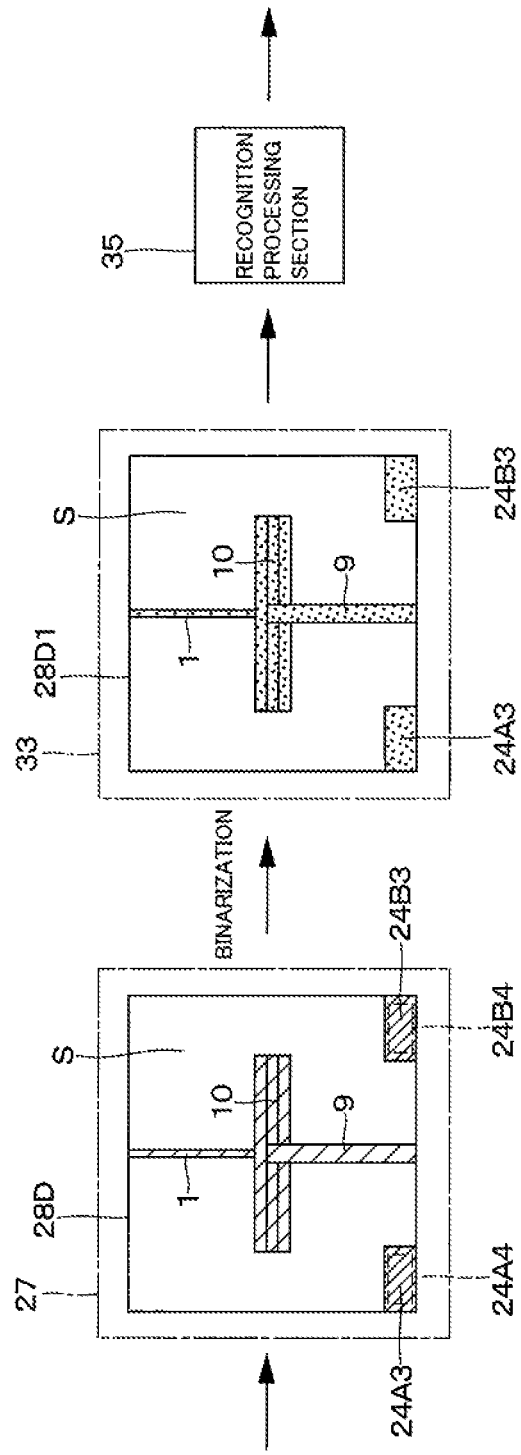
FIG. 10 is an explanatory diagram showing a day image of daylight shooting inputted into an image input section, and a white and black image for daylight mode to which image white and black binarization processing is executed in a binarization processing section in FIG. 4.
Figure 11:
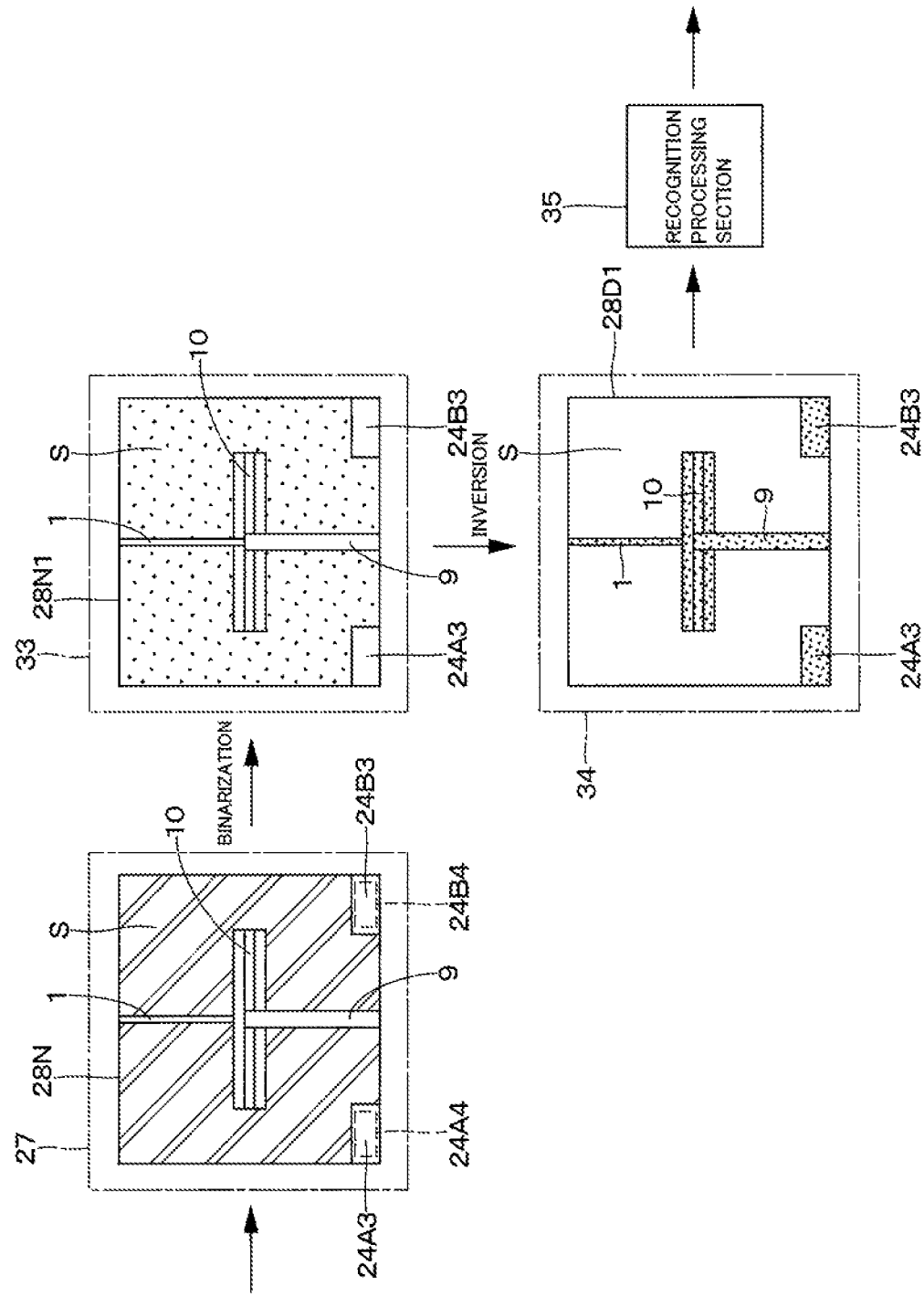
FIG. 11 is an explanatory diagram showing a night image of night shooting inputted into the image input section, a white and black image for night mode to which the image white and black binarization processing is executed in the binarization processing section and an image (the white and black image for day mode) to which white and black inversion processing is executed in an inversion processing section in FIG. 4.

A through hole (not shown) is formed in the fixing part 24A1 of the left reference photographic subject 24A to penetrate in the thickness direction. The left reference photographic subject 24A is attached on the left reference photographic subject fixing part 19B by screwing the bolt 25 through the through hole into the screw seat 19B1 of the left reference photographic subject fixing part 19B. As shown in FIG. 10 and FIG. 11, the shot imaging part 24A3 is set to be reflected in the left lower end side of the image to be shot by the camera 21B. In this case, a central area of the shot imaging part 24A3 is formed as a left reference area 24A4 in which an after-mentioned luminance detecting section 30 in the controller 26 detects a luminance average value. The right reference photographic subject 24B also is configured to include a fixing part 24B1, a bend part 24B2, a shot imaging part 24B3 and a right reference area 24B4.

In this way, the left reference photographic subject 24A and the right reference photographic subject 24B are arranged to be reflected in positions symmetric about the center of the image in the left-right direction. In addition, the shot imaging part 24A3 of the left reference photographic subject 24A and the shot imaging part 24B3 of the right reference photographic subject 24B are positioned on the same plane. As a result, even when disturbance of sunlight or the like is reflected on the left reference photographic subject 24A to be reflected in the imaging device 21, the sunlight is prevented from being reflected to the right reference photographic subject 24B in a relative position different from the left reference photographic subject 24A in relation to the imaging device 21 and being reflected in the imaging device 21.

In addition, since these reference photographic subjects 24A, 24B are always positioned in the same area of the image to be shot because of being fixed integrally with the imaging device 21 through the imaging device attachment tool 15, a stable imaging condition can be obtained. Accordingly, the after-mentioned day or night determination processing section 29 of the controller 26 can perform the determination of day or night with accuracy by using any luminance average value of the luminance average value of the left reference photographic subject 24A and the luminance average value of the right reference photographic subject 24B. An explanation will be later made of the details of the control processing of the day or night determination to be executed by the day or night determination processing section 29.

Figure 4:
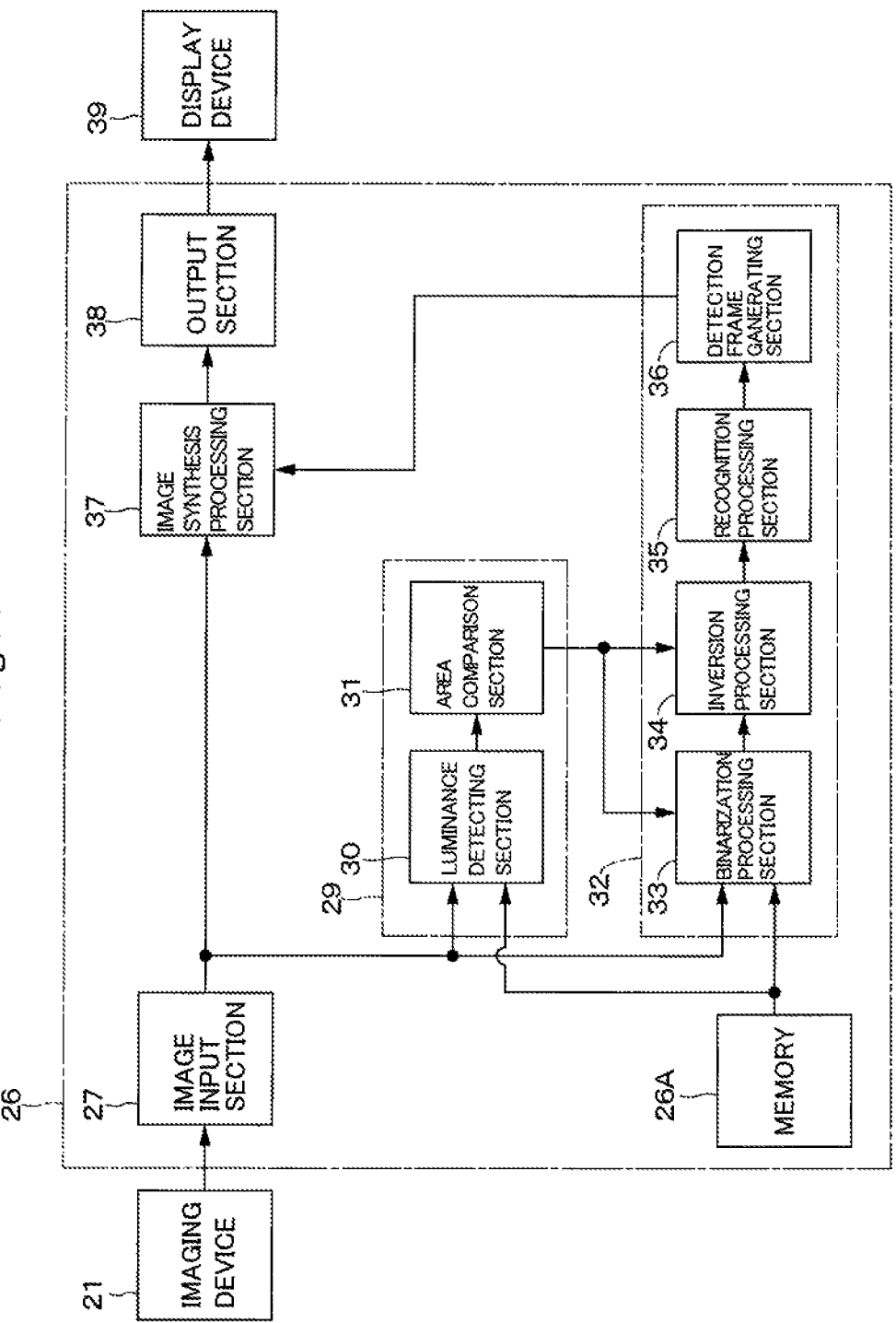
FIG. 4 is a control block diagram of a controller.

FIG. 4 shows a control block diagram of the controller 26. Here, the controller 26 is connected to an unillustrated power source and is activated in response to an ON operation of the key switch. The controller 26 is configured of a microcomputer, for example, and processes an image shot by the camera 21B in the imaging device 21. The controller 26 is disposed in the cab 8, for example, and has an input side to which the imaging device (the camera 21B) is connected via the cable 22 and an output side to which an after-mentioned display device 39 and an unillustrated voice output device are connected. Parameters for image processing and programs of the control processing as shown in FIG. 5 to FIG. 9 are stored in a memory 26A in the controller 26. In addition, the controller 26 is configured to include an image input section 27, the day or night determination processing section 29, an image processing section 32, an image synthesis processing section 37, and an output section 38.

The image input section 27 takes in an image signal from the imaging device 21 to be converted into digital data of eight bits of each of RGB. The image converted into the digital data has one part that is inputted into the day or night determination processing section 29 and the other part that is inputted into the image processing section 32. The day or night determination processing section 29 detects a luminance signal of each of pixels from the image inputted into the luminance detecting section 30 therein, and, next, performs the day or night determination on the imaging environment in an area comparison section 31 based upon luminance information in a detected specific pixel area. The image processing section 32 executes the image processing to the inputted image by switching an image processing parameter, based upon the result of the day or night determination by the day or night determination processing section 29. The image processing parameter (a day or night determination processing parameter) includes presence or absence of a lighting luminance threshold value Lon, an extinction luminance threshold value Loff, a binarization luminance threshold value, and white and black inversion processing, which will be described later.

Next, an explanation will be made of the processing on the shot image. The image processing section 32 executes the image processing based upon any mode of a daylight mode and a night mode determined by the result of the day or night determination by the day or night determination processing section 29. It should be noted that the controller 26 is set to the daylight mode in an initial stage when the key switch is turned on.

The image input section 27 receives input of the shot images of the overhead line 1, the current collector 10 and the reference photographic subject 24 shot by the camera 21B in the imaging device 21 (conveniently referred to as "day image 28D" or "night image 28N" for easily distinguishing day or night during which the shooting is performed at the time of exemplifying the shot image in the following explanation). Here, regarding the reference photographic subject 24, since a sky area S is brighter in the daylight regardless of a lighting state of the illumination device 23, the reference photographic subject 24 is reflected dark in the day image 28D by the AGC function of the camera 21B in the imaging device 21 (refer to FIG. 10). Meanwhile, since it is difficult to distinguish between the overhead line 1, the current collector 10 and the reference photographic subject 24 without turning on the illumination device 23 at night, the overhead line 1, the current collector 10 and the reference photographic subject 24 are reflected brightly in the night image 28N and the sky area S is reflected dark by turning on the illumination device 23 (refer to FIG. 11).

The day or night determination processing section 29 determines day or night of the day image 28D or the night image 28N inputted into the image input section 27. Specifically, the day or night determination processing section 29 determines day or night based upon a luminance average value (luminance information) of the reference photographic subjects 24 of the day image 28D and the night image 28N inputted into the image input section 27. Therefore, the day or night determination processing section 29 is configured to include the luminance detecting section 30 and the area comparison section 31.

The luminance detecting section 30 detects a luminance average value of the left reference photographic subject 24A and a luminance average value of the right reference photographic subject 24B in the day image 28D or the night image 28N inputted into the image input section 27. Specifically, the luminance detecting section 30 detects a left luminance average value La of the left reference area 24A4 corresponding to the left reference photographic subject 24A in the image and detects a right luminance average value Lb of the right reference area 24B4 corresponding to the right reference photographic subject 24B in the image.

The left luminance average value La and the right luminance average value Lb each are detected as data of eight bits for expressing 256 gradations, for example. Therefore, the left luminance average value La and the right luminance average value Lb each are detected as a numerical value between 0 and 255 ($0 \leq La, Lb \leq 255$). In this case, as each numerical value of the luminance average values La, Lb is larger, each of the reference areas 24A, 24B is brighter. In addition, the left luminance average value La and the right luminance average value Lb are outputted to the area comparison section 31.

The area comparison section 31 determines day or night based upon the left luminance average value La and the right luminance average value Lb outputted from the luminance detecting section 30. In this case, the day or night determination processing section 29 compares the left luminance average value La and the right luminance average value Lb with the lighting luminance threshold value Lon stored in the memory 26A to determine day or night. The lighting luminance threshold value Lon is a threshold value at the time of performing the determination of day or night in a case where the overhead line 1, the current collector 10 and the reference photographic subjects 24 are lighted by sunlight or the illumination device 23, and is set by experiments, simulations or the like based upon an environment in the surrounding area where the dump truck 2 travels, for example. The area comparison section 31 outputs the result of the day or night determination toward the binarization processing section 33 and the inversion processing section 34 in the image processing section 32, which will be described later.

Here, since the sky area S is bright in the day image 28D by the AGC function of the camera 21B, the left reference photographic subject 24A and the right reference photographic subject 24B are relatively reflected darker. Meanwhile, in the night image 28N the sky area S is dark and the left reference photographic subject 24A and the right reference photographic subject 24B are illuminated by the illumination device 23 to be reflected brightly. Therefore, the area comparison section 31 determines the environment as the daylight when the left luminance average value La and the right luminance average value Lb each are equal to or less than the lighting luminance threshold value Lon (for example, equal to or less than 200, that is, La, Lb$\leq$200), and determines the environment as the night when the left luminance average value La and the right luminance average value Lb each are larger than the lighting luminance threshold value Lon (La, Lb>Lon).

In addition, in the daylight, there are some cases where the sunlight or the like is reflected on the left reference photographic subject 24A or the right reference photographic subject 24B during the traveling of the dump truck 2 to temporarily brighten the left reference photographic subject 24A or the right reference photographic subject 24B. For example, in a case where the left luminance average value La of the temporarily brightened left reference photographic subject 24A is equal to or more than the lighting luminance threshold value Lon, the area comparison section 31 possibly determines erroneously the environment as the night regardless of the daylight. Therefore, the area comparison section 31 performs the determination of day or night using the luminance average value that is a smaller one of the left luminance average value La and the right luminance average value Lb as a determination luminance average value L in the daylight mode. Thereby, in a case where the dump truck 2 travels in the daylight, it is possible to suppress the erroneous determination of day or night caused by the disturbance reflected in the imaging device 21 by the reflection of the sunlight on any one of the reference photographic subjects 24.

Accordingly, even when the dump truck 2 is traveling, the controller 26 can accurately perform the day or night determination using the reference photographic subject 24 in which a luminance change of the image is smaller. In addition, since the determination of day or night is performed using the luminance average value that is the smaller one of the left reference photographic subject 24A and the right reference photographic subject 24B arranged in symmetrical positions in the left-right direction about the center of the image as the determination luminance average value L, it is possible to further improve the accuracy of the day or night determination.

The image processing section 32 executes different image processing by switching a parameter (an image processing parameter) in the daylight and at night based upon the result of the day or night determination determined by the day or night determination processing section 29, thereby causing the overhead line 1 and the current collector 10 in the image to be more easily recognized. In addition, the image processing section 32 is configured to include the binarization processing section 33, the inversion processing section 34, a recognition processing section 35 and a detection frame generating section 36.

The binarization processing section 33 converts the day image 28D inputted into the image input section 27 to a white and black image 28D1 for day mode in which the sky area S having a typical luminance distribution in the daylight is bright, and converts the night image 28N inputted into the image input section 27 to a white and black image 28N1 for night mode in which the sky area S having a typical luminance distribution at night is dark. In this case, as shown in FIG. 10, the day image 28D is converted to the white and black image 28D1 for day mode in which the sky area S is converted to a white color and the overhead line 1, the current collector 10 and the reference photographic subjects 24 each are converted to a black color. Meanwhile, as shown in FIG. 11, the night image 28N is converted to the white and black image 28N1 for night mode in which the sky area S is converted to a black color and the overhead line 1, the current collector 10 and the reference photographic subjects 24 each are converted to a white color.

Here, as shown in FIG. 4, the determination result from the day or night determination processing section 29 is inputted also into the binarization processing section 33, and a binarization luminance threshold value also, which is an image processing parameter for carrying out appropriate binarization in accordance with a luminance distribution of an image different between day and night, is changed to differ between the daylight mode and the night mode, respectively. As a result, by distinguishing the overhead line 1, the current collector 10 and the reference photographic subjects 24 over the sky area S for recognition, it is possible to obtain a binarization image appropriate for the image processing to be executed to an image of each of day and night. The white and black image 28D1 for daylight mode or the white and black image 28N1 for night mode conversion-processed to the white and black image in the binarization processing section 33 is outputted into the inversion processing section 34.

The inversion processing section 34 executes the white and black inversion processing of the white and black image 28N1 for night mode. Specifically, in a case where the inversion processing section 34 recognizes the result of the day or night determination outputted from the area comparison section 31 in the day or night determination processing section 29 as the night determination, the image outputted into the inversion processing section 34 from the binarization processing section 33 is recognized as the white and black image 28N1 for night mode to execute the white and black inversion processing (switch of the parameter) of the white and black image 28N1 for night mode. Thereby, the white and black image 28N1 for night mode becomes the same image as the white and black image 28D1 for daylight mode since the sky area S changes from black color to white color and the overhead line 1, the current collector 10 and the reference photographic subjects 24 become from white color to black color.

Meanwhile, in a case where the inversion processing section 34 recognizes the result of the day or night determination outputted from the area comparison section 31 in the day or night determination processing section 29 as the day determination, the white and black inversion processing of the white and black image 28D1 for day mode outputted into the inversion processing section 34 from the binarization processing section 33 is not executed. That is, in a case where the result of the day or night determination is recognized as the night determination, the inversion processing section 34 executes the white and black inversion processing of the white and black image 28N1 for night mode such that the sky area S becomes a white color and the overhead line 1, the current collector 10 and the reference photographic subjects 24 become a black color, whereby the white and black image 28N1 for night mode is unified to the image in the same form as the white and black image 28D1 for day mode. In addition, the unified white and black image 28D1 for day mode is outputted to the recognition processing section 35.

The recognition processing section 35 recognizes the overhead line 1 and the current collector 10 from the white and black image 28D1 for day mode outputted from the inversion processing section 34. Specifically, the recognition processing section 35 moves a template image, which is in advance stored in the memory 26A, in the white and black image 28D1 for day mode at constant intervals to carry out pattern matching for looking for a place the highest in a correlative value, thus recognizing the overhead line 1 and the current collector 10.

In this case, since the white and black image 28N1 for night mode is converted to the white and black image 28D1 for day mode in the inversion processing section 34, the recognition processing section 35 can carry out the pattern matching by one kind of template image matched to the white and black image 28D1 for day mode through the day and the night. Thereby, a processing speed for recognizing the overhead line 1 and the current collector 10 becomes faster than in a case of carrying out the pattern matching using two kinds of template images composed of a template image for day and a template image for night. Further, it is possible to reduce a load of the calculation processing associated with the pattern matching.

The detection frame generating section 36 generates a straight line and a detection frame to a position of each of the overhead line 1 and the current collector 10 recognized in the recognition processing section 35. That is, the detection frame generating section 36 generates the straight line in the position of being recognized as the overhead line 1 in the recognition processing section 35 and generates the detection frame in the position of being recognized as the current collector 10 in the recognition processing section 35, which are outputted to the image synthesis processing section 37.

The image synthesis processing section 37 synthesizes the straight line of the overhead line 1 and the detection frame of the current collector 10 that are generated in the detection frame generating section 36 with the colored day image 28D or the colored night image 28N inputted into the image input section 27. In addition, the synthesized image is outputted to the after-mentioned display device 39 from an output section 38. In addition, in the output section 38, an unillustrated monitor part in the controller 26 performs output of warning sound generation to an unillustrated warning sound generating device in a case where the current collector 10 is about to come off from the overhead line 1, for example.

Figure 12:
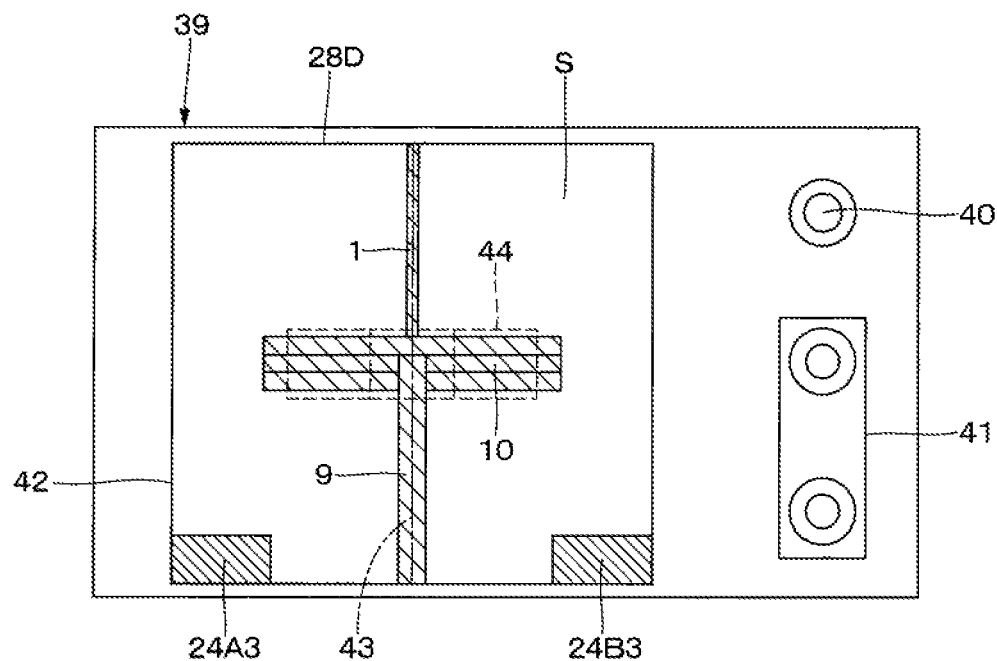
FIG. 12 is a front view showing an image in the daylight to be displayed in a display device.
Figure 13:
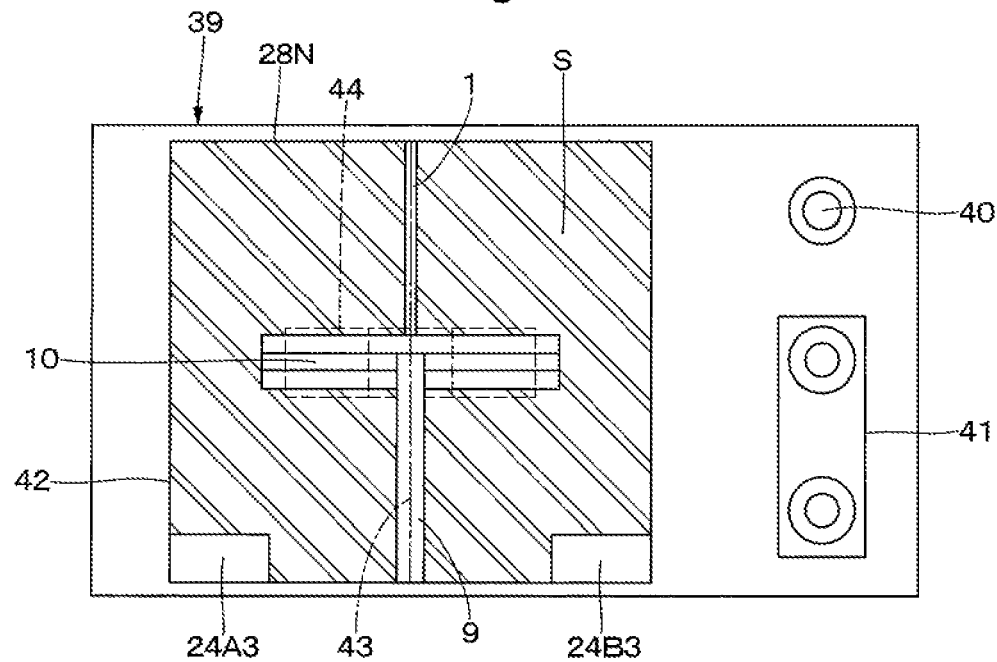
FIG. 13 is a front view showing an image at night to be displayed in the display device.

The display device 39 displays the image processed by the controller 26. The display device 39 is disposed in the cab 8, for example, and can be operated and confirmed in a state where an operator is seated on an operator's seat. As shown in FIG. 12 and FIG. 13, the display device 39 is configured to include a key switch 40, an illumination switch 41 and a display part 42. When an operator performs an ON operation of the key switch 40, the image processed by the controller 26 is displayed on the display part 42.

Here, as shown in FIG. 12, in the daylight an image in which a straight line 43 of the overhead line 1 and a detection frame 44 of the current collector 10 are processed to be synthesized in the image synthesis processing section 37 is displayed on the day image 28D. The straight line 43 shown in a dashed-dotted line in FIG. 12 highlights the overhead line 1 in a red, blue or yellow color, for example. Meanwhile, the detection frame 44 shown in a dotted line in FIG. 12 highlights the current collector 10 in a color different from that of the straight line 43, for example. In addition, as shown in FIG. 13, as similar even at night, the overhead line 1 is highlighted by the straight line 43 and the current collector 10 is highlighted by the detection frame 44. As a result, a position of the current collector 10 to the overhead line 1 is easily recognized, making it possible to improve the operability in driving control of the dump truck 2.

The monitor device 11 mounted on the dump truck 2 according to the first embodiment has the configuration as described above, and next, an explanation will be made of the control processing by the controller 26 in the monitor device 11 with reference to FIG. 5 to FIG. 9. It should be noted that the control processing of the controller 26 is repeatedly executed in a predetermined control cycle until the key switch is turned off after the key switch is turned on, for example. That is, the day or night determination, the mode setting, and the image processing based upon the set mode are repeatedly executed.

Figure 5:
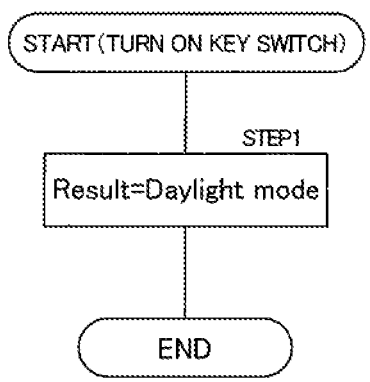
FIG. 5 is a flow chart showing control processing of an initial setting to be carried out in the controller.

First, as shown in FIG. 5, the controller 26 performs an initial setting of variable when the processing operation is started by turning on the key switch. In addition, in step 1, the daylight mode is set for a case of performing the day or night determination for the first time (after turning on the key switch) (Result=Daylight mode).

Figure 6:
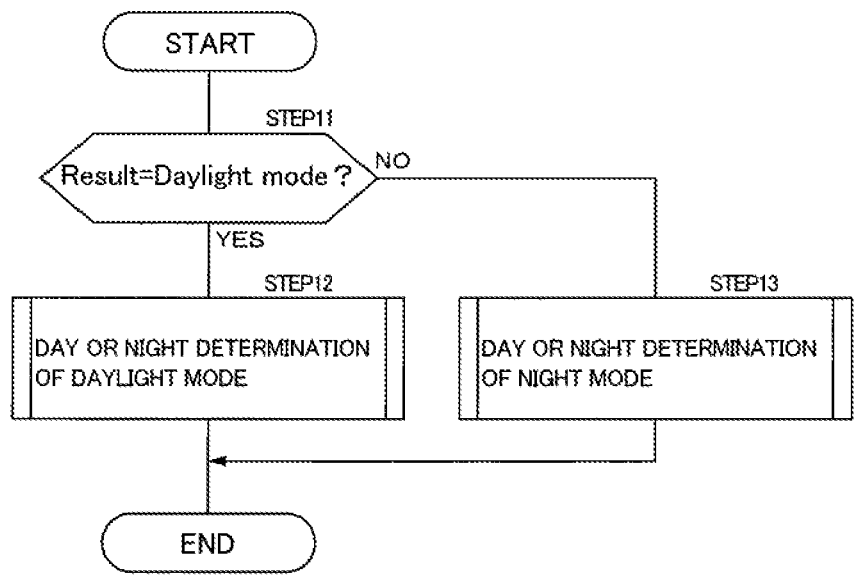
FIG. 6 is a flow chart showing processing for determining any one of a daylight mode and a night mode to be executed in the controller.

Next, as shown in FIG. 6, the controller 26 determines whether to execute the control processing of the day or night determination in the daylight mode or the control processing of the day or night determination in the night mode. In this case, in step 11, it is determined whether or not a mode set (stored) at present is the daylight mode (Result=Daylight mode?). That is, in a case after the key switch is turned on, the image processing parameter for daylight mode is outputted from the memory 26A in the controller 26 in step 1. Meanwhile, in a case other than that, an image processing parameter for mode based upon the previous result of the day or night determination is outputted from the memory 26A in the controller 26.

In addition, in a case where in step 11 "YES" is determined, that is, the daylight mode is set, the process goes to step 12, wherein the control processing of the day or night determination in the daylight mode is executed. Meanwhile, in a case where in step 11 "NO" is determined, that is, the night mode is set, the process goes to step 13, wherein the control processing of the day or night determination in the night mode is executed.

Next, an explanation will be made of the control processing of the day or night determination in the daylight mode that is executed in step 12 in FIG. 6 with reference to FIG. 7. The control processing of the day or night determination in the daylight mode is executed in the day or night determination processing section 29 in the controller 26.

First, in step 21, the left luminance average value La in the left reference area 24A4 of the left reference photographic subject 24A is obtained. That is, the luminance detecting section 30 in the day or night determination processing section 29 obtains the left luminance average value La in the left reference area 24A4 of the image (the day image 28D or the night image 28N) inputted into the image input section 27. In next step 22, the right luminance average value Lb in the right reference area 24B4 of the right reference photographic subject 24B is obtained. That is, the luminance detecting section 30 in the day or night determination processing section 29 obtains the right luminance average value Lb in the right reference area 24B4 of the image (the day image 28D or the night image 28N) inputted into the image input section 27. The left luminance average value La and the right luminance average value Lb each are set as a value between 0 and 255 in such a manner as to be the larger as the left reference photographic subject 24A and the right reference photographic subject 24B are brighter ($0 \leq La, Lb \leq 255$).

In next step 23, it is determined whether the left luminance average value La is equal to or more than the right luminance average value Lb ($La \geq Lb$). That is, the area comparison section 31 in the day or night determination processing section 29 determines which of the left luminance average value La and the right luminance average value Lb is a luminance average value that is a smaller one thereof. In a case where in step 23 "YES" is determined, that is, the left luminance average value La is equal to or more than and the right luminance average value Lb, the process goes to step 24, wherein the determination luminance average value L is set to the right luminance average value Lb ($L=La \leq Lb$). Meanwhile, in a case where in step 23 "NO" is determined, that is, the left luminance average value La is determined to be smaller than the right luminance average value Lb, the process goes to step 25, wherein the determination luminance average value L is set to the left luminance average value La ($L=La<Lb$).

As a result, disturbance of sunlight or the like is reflected in the daylight to brighten any one of the left reference photographic subject 24A and the right reference photographic subject 24B, thus making it possible to exclude the luminance average value that has temporarily become a large value. Accordingly, the erroneous determination of the area comparison section 31 can be suppressed to improve the determination accuracy of the day or night determination.

In next step 26, it is determined whether the determination luminance average value L is equal to or less than the lighting luminance threshold value Lon ($Lon \geq L$). That is, the area comparison section 31 in the day or night determination processing section 29 determines whether or not the luminance average value as the smaller value of the left luminance average value La and the right luminance average value Lb is equal to or less than Lon. In a case where in step 26 "YES" is determined, that is, the determination luminance average value L is determined to be equal to or less than the lighting luminance threshold value Lon, the process goes to step 27. Meanwhile, in a case where in step 26 "NO" is determined, that is, the determination luminance average value L is determined to be larger than the lighting luminance threshold value Lon, the process goes to step 28.

In step 27, the daylight mode is set (Result=Daylight mode). That is, the area comparison section 31 sets the daylight mode to the image processing section 32 in the controller 26 based upon the image inputted into the image input section 27 being determined as the day image 28D, and the process ends.

Meanwhile, in step 28, the night mode is set (Result=Night mode). That is, the area comparison section 31 sets the night mode to the image processing section 32 in the controller 26 based upon the image inputted into the image input section 27 being determined as the night image 28N, and the process ends.

Next, an explanation will be made of the control processing of the day or night determination in the night mode that is executed in step 13 in FIG. 6 with reference to FIG. 8. The control processing of the day or night determination is executed in the day or night determination processing section 29 in the controller 26.

First, in step 31, the left luminance average value La in the left reference area 24A4 of the left reference photographic subject 24A is obtained. In step 31, the control processing as similar to that in step 21 in FIG. 7 is executed. It should be noted that in step 31, the right luminance average value Lb in the right reference area 24B4 of the right reference photographic subject 24B may be obtained instead of obtaining the left luminance average value La, and the subsequent control processing may be executed using the right luminance average value Lb. That is, there is assumed that at night, the luminance level of the reference photographic subject 24 gets high because of the reflection of the optical source of a street lamp or the like on the reference photographic subject 24. However, since at night, the reference photographic subject 24 is illuminated by the illumination device 23 to stay high in the luminance level, even when the disturbance of the street lamp or the like is reflected on the reference photographic subject 24, the day or night determination is not affected. Accordingly, in the night mode a luminance average value as any one of the left luminance average value La of the left reference photographic subject 24A and the right luminance average value Lb of the right reference photographic subject 24B is obtained.

In next step 32 it is determined whether or not the left luminance average value La is equal to or less than the lighting luminance threshold value Lon ($Lon \geq La$). That is, it is determined whether or not the left luminance average value La is equal to or less than the lighting luminance threshold value Lon by setting the left luminance average value La as the determination luminance average value L. In a case where in step 32 "YES" is determined, that is, the left luminance average value La is determined to be equal to or less than the lighting luminance threshold value Lon, the process goes to step 33, wherein the daylight mode is set (Result=Daylight mode), and process ends. Meanwhile, in a case where in step 32 "NO" is determined, that is, the left luminance average value La is larger than the lighting luminance threshold value Lon, the process goes to step 34, wherein the night mode is set (Result=Night mode), and process ends.

Figure 9:
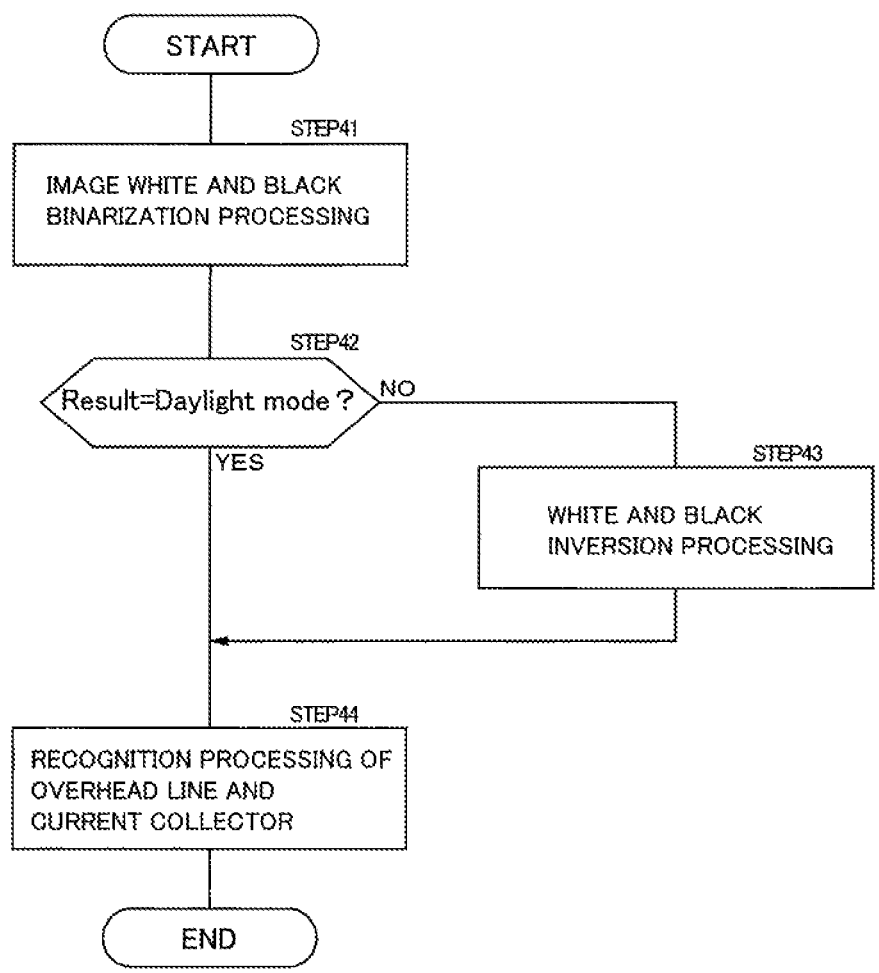
FIG. 9 is a flow chart showing image processing in accordance with the result of the day or night determination.

Next, an explanation will be made of the recognition control processing to the overhead line 1 and the current collector 10 to be executed in the image processing section 32 in the controller 26 with reference to FIG. 9.

First, in step 41, the white and black binarization processing of an image is executed. The white and black binarization processing of the image is executed in the binarization processing section 33 in the image processing section 32. As shown in FIG. 10, the white and black binarization processing of the image converts the colored day image 28D inputted into the image input section 27 to the white and black image 28D1 for day mode. Meanwhile, as shown in FIG. 11, the white and black binarization processing of the image converts the colored night image 28N inputted into the image input section 27 to the white and black image 28N1 for night mode.

In next step 42, it is determined whether or not the result of the day or night determination is the daylight mode (Result=Daylight mode). The day or night determination is performed in the area comparison section 31 in the day or night determination processing section 29, and the determination result is outputted to the inversion processing section 34 in the image processing section 32. In addition, in a case where in step 42 "YES" is determined, that is, the result of the day or night determination is determined as the daylight mode, the process goes to step 44. Meanwhile, in a case where in step 42 "NO" is determined, that is, the result of the day or night determination is determined as the night mode, the process goes to step 43.

In step 43, the white and black inversion processing is executed. The white and black inversion processing is executed in the inversion processing section 34 in the image processing section 32. That is, in a case where the result determined in the area comparison section 31 is at night, the inversion processing section 34 executes the white and black inversion processing of the white and black image 28N1 for night mode white and black-converted in the binarization processing section 33. Thereby, in the white and black image 28N1 for night mode, the sky area S changes from black color to white color and the overhead line 1, the current collector 10 and the reference photographic subjects 24 are converted from white color to black color (refer to FIG. 11). Thereby, the white and black image 28N1 for night mode becomes an image in the same form as the white and black image 28D1 for daylight mode, and this image is outputted to the recognition processing section 35.

In next step 44, the recognition processing of the current collector and the overhead line is executed. This recognition processing is executed in the recognition processing section 35 in the image processing section 32. In the recognition processing section 35, the template image, which is in advance stored in the memory 26A in the controller 26, is moved at constant intervals in the image (the white and black image 28D1 for day mode) outputted from the inversion processing section 34 to execute pattern matching for looking for a place the highest in a correlative value, thus recognizing the overhead line 1 and the current collector 10, and the process ends.

Figure 14:
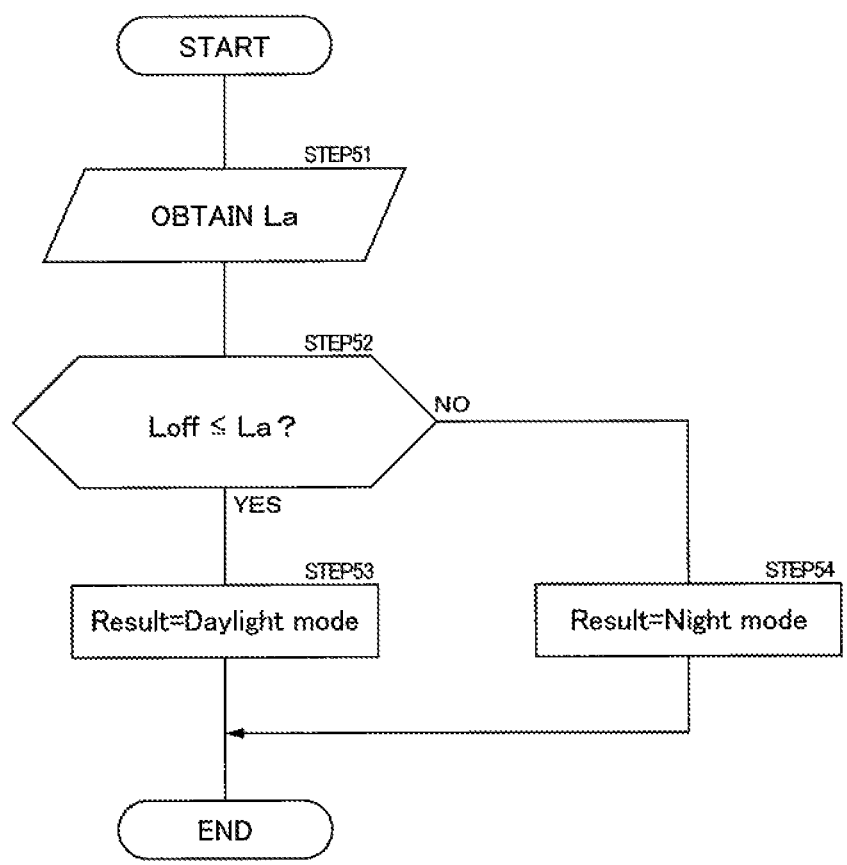
FIG. 14 is a flow chart showing processing of a day or night determination in a daylight mode according to a second embodiment of the present invention.
Figure 15:
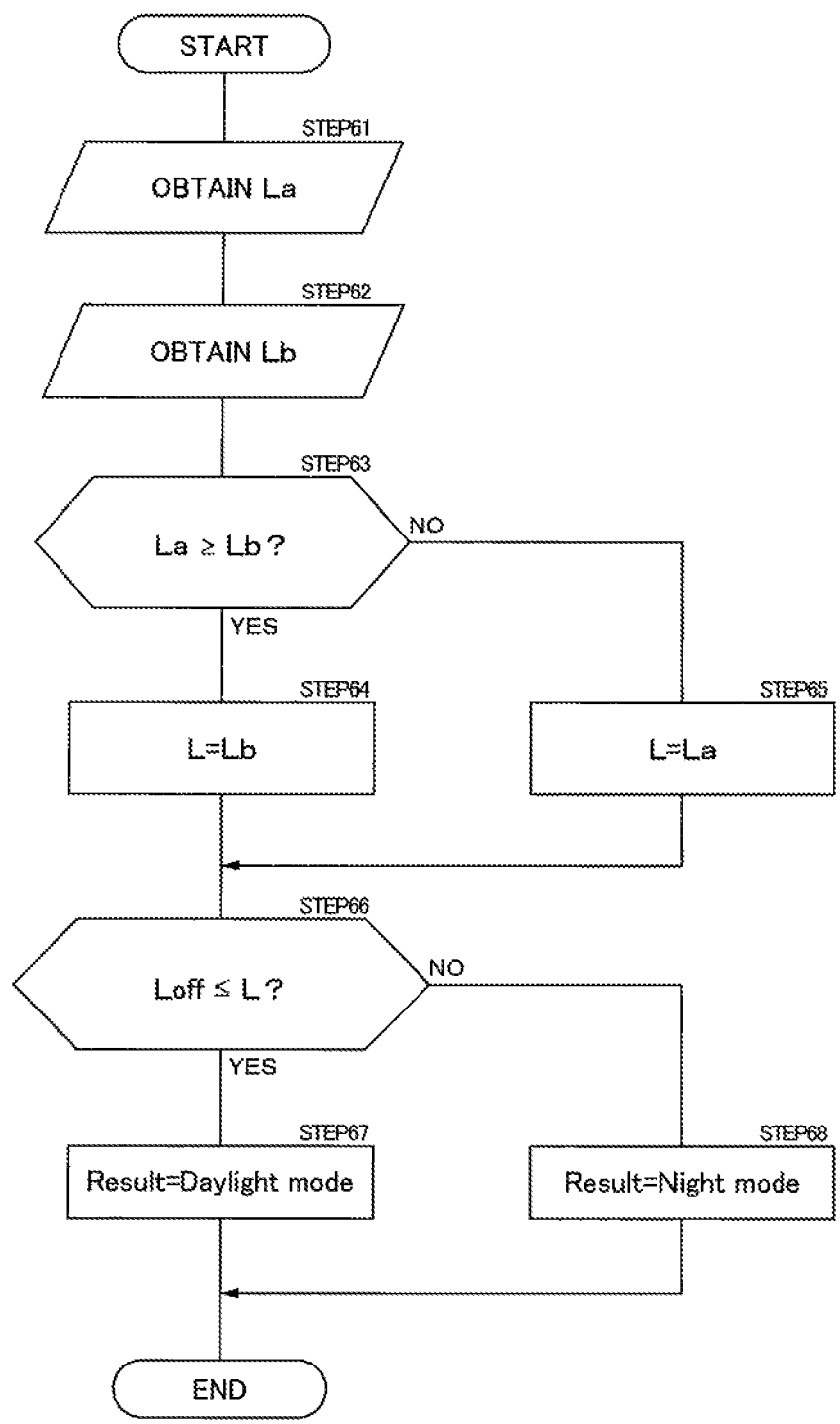
FIG. 15 is a flow chart showing processing of a day or night determination in a night mode according to the second embodiment of the present invention.

Next, FIG. 14 and FIG. 15 show a second embodiment of the present invention. The second embodiment is characterized by control processing of a day or night determination in a case where the illumination device 23 as shown in the first embodiment is not disposed or in a case where the illumination device 23 is turned off. It should be noted that in the second embodiment, components identical to those in the first embodiment are referred to as identical reference numerals, and the explanation is omitted.

An explanation on a series of the processing as shown in FIG. 5 and FIG. 6 in the same way as the first embodiment is omitted, and next, an explanation will be made of the control processing of the day or night determination in the daylight mode that is executed in step 12 in FIG. 6 with reference to FIG. 14. This control processing of the day or night determination is executed in the day or night determination processing section 29 in the controller 26.

In step 51, the left luminance average value La in the left reference area 24A4 of the left reference photographic subject 24A is obtained. In step 51, the control processing as similar to that in step 21 in FIG. 7 is executed. It should be noted that in step 51, instead of obtaining the left luminance average value La, the right luminance average value Lb in the right reference area 24B4 of the right reference photographic subject 24B may be obtained to execute the subsequent control processing using the right luminance average value Lb. The left luminance average value La and the right luminance average value Lb each are set as a value between 0 and 255 in such a manner as to be the larger as the left reference photographic subject 24A and the right reference photographic subject 24B are brighter ($0 \leq La$, $Lb \leq 255$). In this case, without illumination (without irradiation), the left luminance average value La and the right luminance average value Lb each become a smaller value than with illumination (in the first embodiment).

In next step 52, it is determined whether or not the left luminance average value La is equal to or more than the extinction luminance threshold value Loff ($Loff \leq La$). That is, the left luminance average value La is set as the determination luminance average value L to determine whether or not the left luminance average value La is equal to or more than the extinction luminance threshold value Loff. The extinction luminance threshold value Loff is a threshold value at the time of performing the determination of day or night in a case where the overhead line 1, the current collector 10 and the reference photographic subjects 24 are not illuminated, and is a value smaller than the lighting luminance threshold value Lon. In addition, the extinction luminance threshold value Loff also is in advance stored in the memory 26A in the controller 26. That is, the left luminance average value La and the right luminance average value Lb each are a value equal to or more than Loff in the daylight and the value gradually becomes smaller as closer to the night.

Here, in the daylight, the luminance average value of the reference photographic subject 24 is higher (larger) than at night. In this case, for example, when the dump truck 2 enters the shade at the traveling, the luminance average value of the reference photographic subject 24 becomes low, therefore, possibly causing the day or night determination to be an erroneous determination. Therefore, the extinction luminance threshold value Loff is set by experiments, simulations or the like in such a manner as to be larger than the luminance average value of the reference photographic subject 24 to be detected at night and smaller than the luminance average value of the reference photographic subject 24 to be detected in a case where the dump truck 2 enters the shade. Accordingly, in a case of the day or night determination in the daylight mode, it is possible to perform the day or night determination based upon the luminance average value of the reference photographic subject that is any one of the left reference photographic subject 24A and the right reference photographic subject 24B without consideration of the erroneous determination of the day or night determination caused by the disturbance.

In a case where in step 52 "YES" is determined, that is, the left luminance average value La is determined to be equal to or more than the extinction luminance threshold value Loff, the process goes to step 53, wherein the result of the day or night determination is set to the daylight mode (Result=Daylight mode), and the process ends. Meanwhile, in a case where in step 52 "NO" is determined, that is, the left luminance average value La is determined to be a value smaller than the extinction luminance threshold value Loff, the process goes to step 54, wherein the result of the day or night determination is set to the night mode (Result=Night mode), and the process ends.

Next, an explanation will be made of the control processing of the day or night determination in the night mode that is executed in step 13 in FIG. 6 with reference to FIG. 15. The control processing of the day or night determination is executed in the day or night determination processing section 29 in the controller 26.

Figure 7:
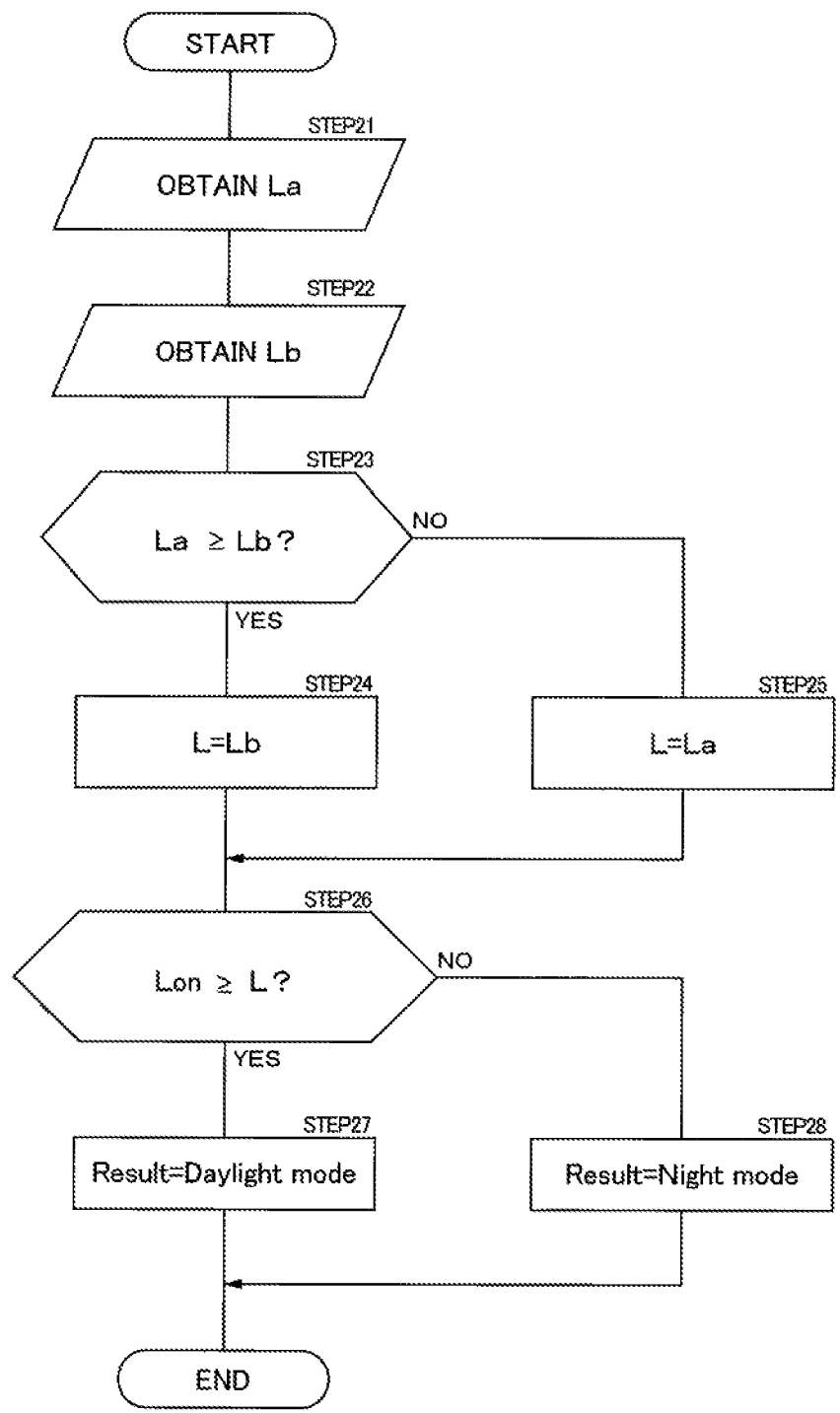
FIG. 7 is a flow chart showing processing of a day or night determination in a daylight mode according to the first embodiment of the present invention.

In step 61 to step 65, control processing in the same way as that from step 21 to step 25 in FIG. 7 is executed. In this case, in step 63, it is determined whether or not the left luminance average value La is equal to or more than the right luminance average value Lb (La Lb). As a result, an optical source (disturbance) of a street lamp or the like is reflected at night to brighten any one of the left reference photographic subject 24A and the right reference photographic subject 24B, thus making it possible to exclude the luminance average value that has temporarily become a large value. Accordingly, the erroneous determination of the day or night determination processing section 29 can be suppressed to improve the determination accuracy of the day or night determination.

In step 66, it is determined whether or not the determination luminance average value L is equal to or more than the extinction luminance threshold value Loff (for example, 75) (Loff≤L). That is, the area comparison section 31 in the day or night determination processing section 29 determines whether or not the luminance average value as a smaller value of the left luminance average value La and the right luminance average value Lb is equal to or more than Loff. In a case where in step 66 "YES" is determined, that is, the determination luminance average value L is determined to be equal to or more than the extinction luminance threshold value Loff, the process goes to step 67, wherein the result of the day or night determination is set to the daylight mode (Result=Daylight mode), and the process ends. Meanwhile, in a case where in step 66 "NO" is determined, that is, the determination luminance average value L is determined to be a value smaller than the extinction luminance threshold value Loff, the process goes to step 68, wherein the result of the day or night determination is set to the night mode (Result=Night mode), and the process ends.

In this way, the second embodiment also can, in the same way as the first embodiment, perform the determination of day or night with accuracy based upon the luminance average value of the reference photographic subjects 24 to be reflected in the positions not to interrupt the shooting of the objects (the overhead line 1 and the current collector 10). In addition, since the left reference photographic subject 24A and the right reference photographic subject 24B as the reference photographic subjects 24 are arranged to be displayed in the different positions in the image, it is possible to suppress the erroneous determination of the day or night determination by performing the determination of day or night based upon the smaller luminance average value at night.

Figure 16:
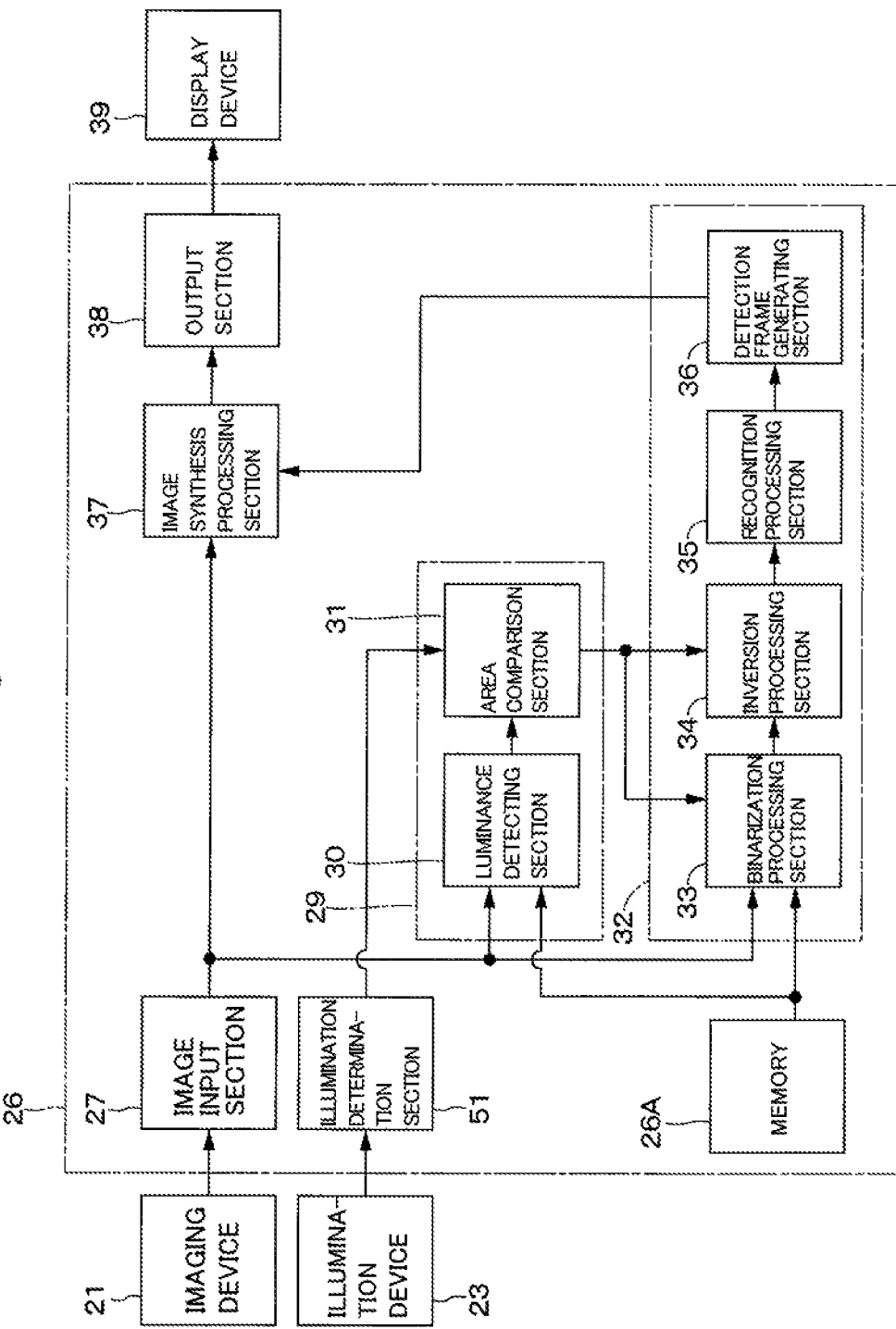
FIG. 16 is a control block diagram of a controller according to a third embodiment of the present invention.
Figure 18:
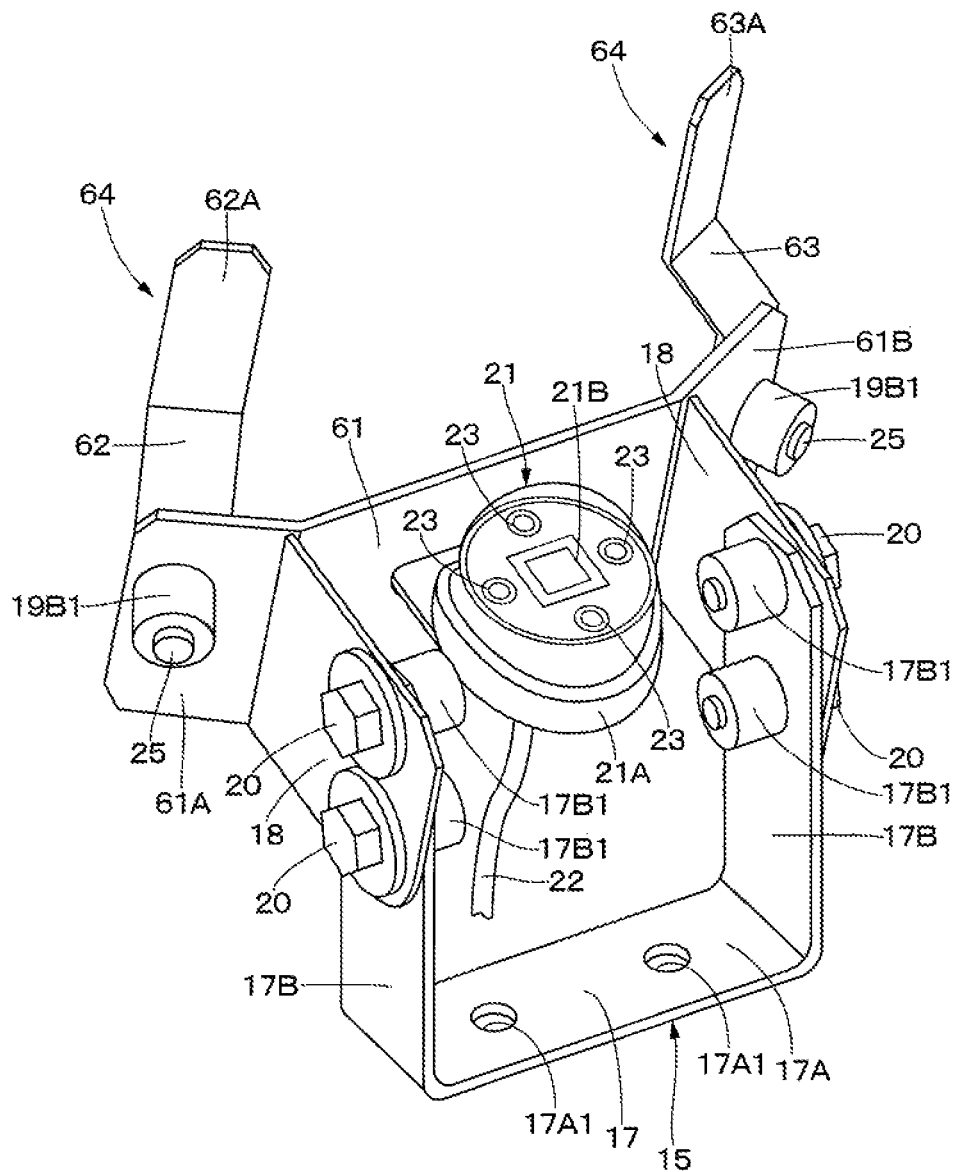
FIG. 18 is a perspective view showing a bracket, an imaging device provided with an illumination device, a left reference photographic subject, a right reference photographic subject and the like according to a first modification example of the present invention.

Next, FIG. 16 and FIG. 18 show a third embodiment of the present invention. The third embodiment is characterized in that the controller 26 is provided with an illumination determination section 51 configured to determine whether the illumination device 23 is turned on or turned off and the control processing of the day or night determination is executed based upon the determination result of the illumination determination section 51. It should be noted that in the third embodiment, components identical to those in the first embodiment are referred to as identical reference numerals, and the explanation is omitted.

The illumination determination section 51 is configured to determine the lighting and the extinction of the illumination device 23 and is disposed in the controller 26. The illumination determination section 51 has an input side that is connected to the illumination device 23 and an output side that is connected to the area comparison section 31 in the day or night determination processing section 29. The illumination determination section 51 can determine the lighting and the extinction of the illumination device 23 based upon information of ON and OFF operations of the illumination device obtained from, for example, a lighting sensor (not shown) for detecting the lighting and the extinction of the illumination device 23, a voltage (current) sensor (not shown) for detecting power supply to the illumination device 23, an illumination switch 41 for performing the ON and OFF operations of the illumination device 23 disposed in the cab 8, and the like.

Next, an explanation will be made of the control processing of the day or night determination that is executed in the controller 26.

Figure 17:
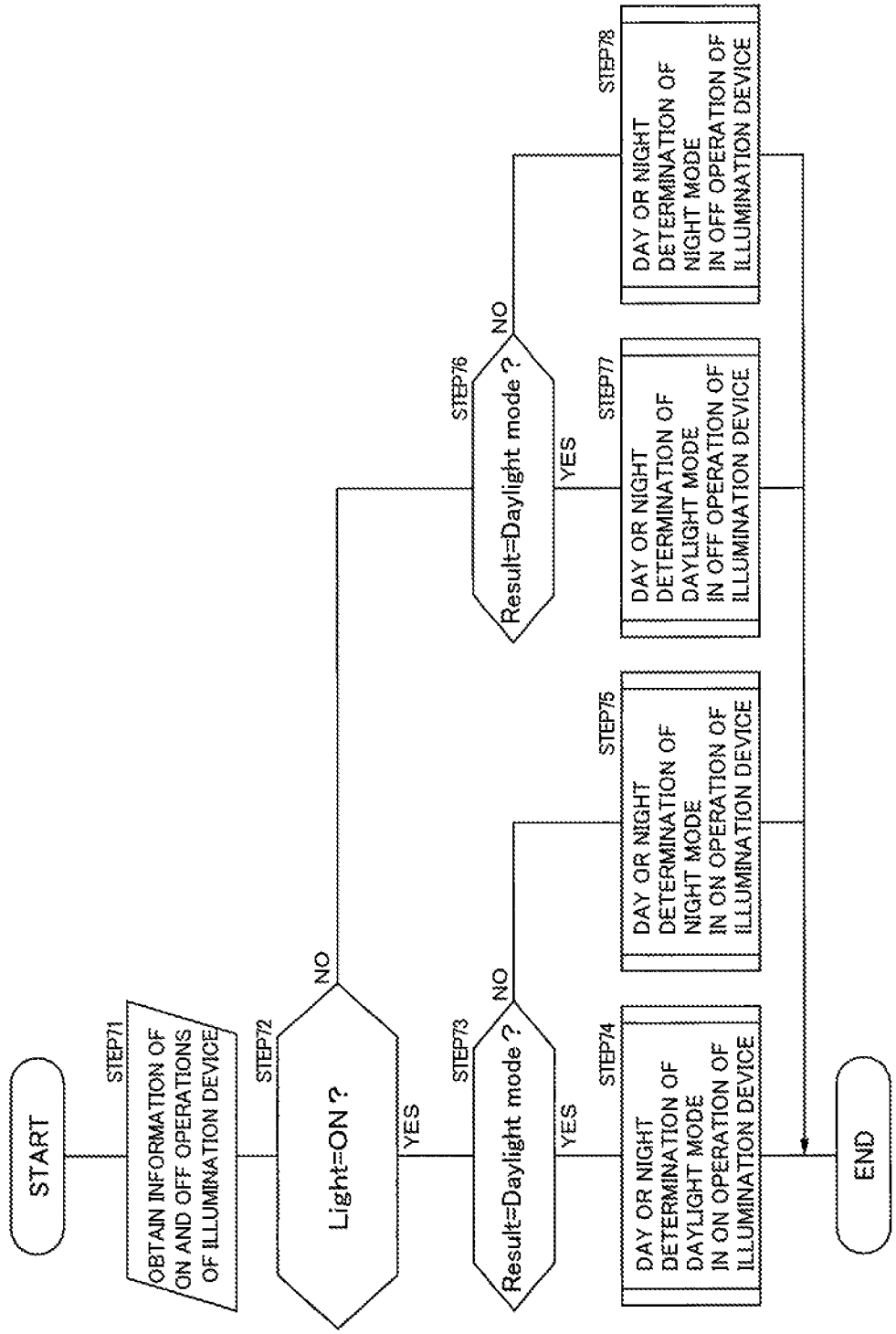
FIG. 17 is a flow chart showing processing for determining any one of a daylight mode and a night mode based upon lighting and extinction of an illumination device.

An explanation on a series of the processing as shown in FIG. 5 and FIG. 6 in the same way as the first embodiment is omitted, and next, an explanation will be made of the control processing of the day or night determination that is executed in the controller 26 based upon the determination result of the lighting and the extinction of the illumination device 23 with reference to FIG. 17. This control processing as shown in FIG. 17 is stored in the memory 26A in the controller 26.

First, in step 71 the information of the ON and OFF operations of the illumination device 23 is obtained by the illumination determination section 51 in the controller 26, and the process goes to next step 72. In step 72, it is determined whether or not the illumination device 23 is turned on. In addition, in a case where in step 72 "YES" is determined, that is, the illumination device 23 is determined to be turned on, the process goes to step 73. Meanwhile, in a case where in step 72 "NO" is determined, that is, the illumination device 23 is determined to be turned off, the process goes to step 76.

In step 73, it is determined whether or not the mode set at present is the daylight mode (Result=Daylight mode). That is, in a case after the key switch is turned on, the daylight mode is set to the memory 26A in the controller 26 in step 1 in FIG. 5. Meanwhile, in a case other than that, a mode based upon the previous result of the day or night determination is set to the memory 26A in the controller 26. In addition, in a case where in step 73 "YES" is determined, that is, the daylight mode is set, the process goes to step 74, wherein the control processing of the day or night determination in the daylight mode as shown in FIG. 7 is executed, and the process ends. Meanwhile, in a case where in step 73 "NO" is determined, that is, the night mode is set, the process goes to step 75, wherein the control processing of the day or night determination in the night mode as shown in FIG. 8 is executed, and the process ends.

In step 76, likewise, it is determined whether or not the mode set at present is the daylight mode (Result=Daylight mode). In addition, in a case where in step 76 "YES" is determined, that is, the daylight mode is set, the process goes to step 77, wherein the control processing of the day or night determination in the daylight mode as shown in FIG. 14 is executed, and the process ends. Meanwhile, in a case where in step 76 "NO" is determined, that is, the night mode is set, the process goes to step 78, wherein the control processing of the day or night determination in the night mode as shown in FIG. 15 is executed, and the process ends.

As a result, the third embodiment can likewise achieve the operation and the effect as similar to those in the first embodiment. Particularly, it is detected whether or not the illumination device 23 is illuminating the overhead line 1, the current collector 10 and the reference photographic subjects 24 regardless of the daylight or the night, and the luminance threshold value of the day or night determination is changed to the lighting luminance threshold value Lon and the extinction luminance threshold value Loff based upon the detection result. Therefore, the day or night determination can be performed in accordance with the situation.

It should be noted that in the aforementioned first embodiment, a case where the shot imaging part 24A3 of the left reference photographic subject 24A and the shot imaging part 24B3 of the right reference photographic subject 24B are arranged on the same plane to be spaced in the left-right direction is explained. However, the present invention is not limited thereto, but, for example, as in the case of a first modification example as shown in FIG. 18, a shot image part 62A of a left reference photographic subject 62 and a shot image part 63A of a right reference photographic subject 63 may be arranged to form an angle therebetween by bending a left reference photographic subject fixing part 61A and a right reference photographic subject fixing part 61B in an extension plate 61 of the bracket 12. In this case, the angle between the left reference photographic subject 62 and the right reference photographic subject 63 is set such that the disturbance of the sunlight or the like is not reflected on the shot image part 62A and the shot image part 63A simultaneously. Reference photographic subjects 64 are configured of the left reference photographic subject 62 and the right reference photographic subject 63.

Figure 19:
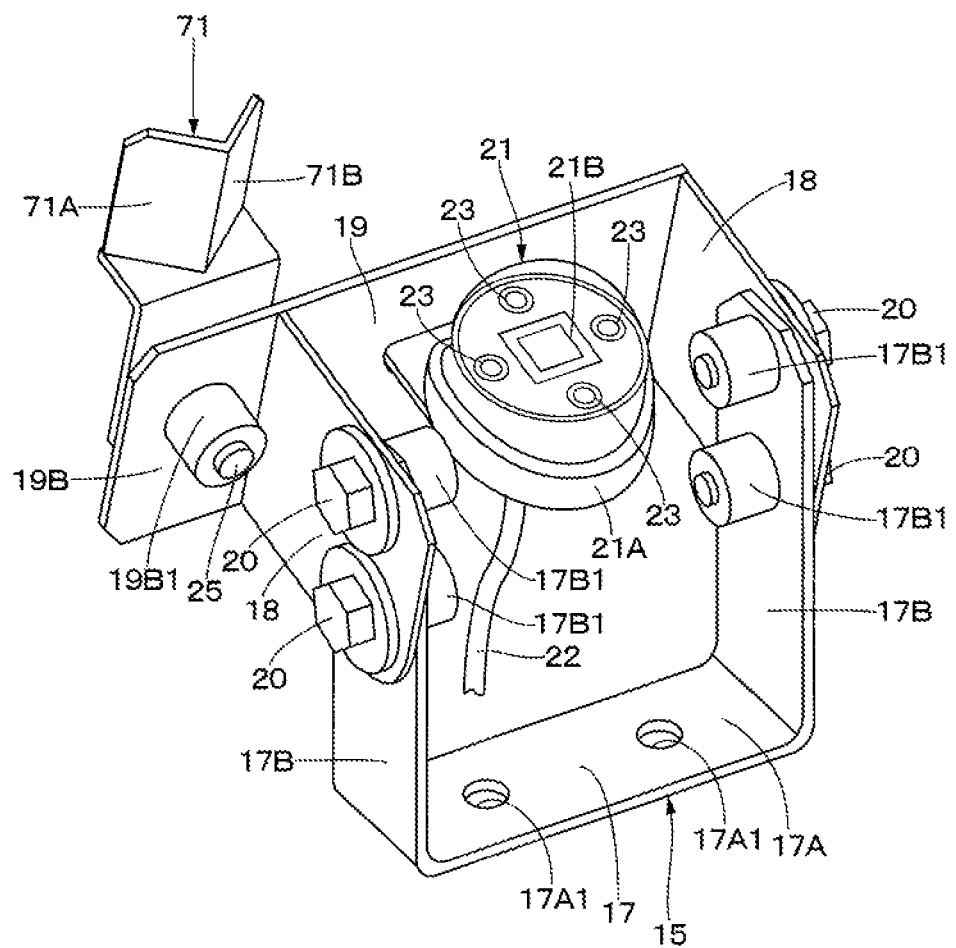
FIG. 19 is a perspective view showing a bracket, an imaging device provided with an illumination device, a left reference photographic subject, a right reference photographic subject and the like according to a second modification example of the present invention.

In addition, in the aforementioned first embodiment, a case where the left reference photographic subject 24A and the right reference photographic subject 24B are arranged such that the reference photographic subjects 24 are reflected on both sides in the image in the left-right direction, is explained. However, the present invention is not limited thereto, but, for example, as in the case of a second modification example as shown in FIG. 19, reference photographic subjects 71 composed of a left reference photographic subject 71A and a right reference photographic subject 71B that are formed integrally and are adjusted in an angle therebetween such that disturbance of the sunlight or the like is not reflected simultaneously thereon may be arranged on either side in the left-right direction to be shot in positions different from an object in the image area to be shot. In this case, the left reference photographic subject 71A and the right reference photographic subject 71B are formed in a bent state in such a manner as to face the camera 21B in the imaging device 21 at different angles.

Figure 20:
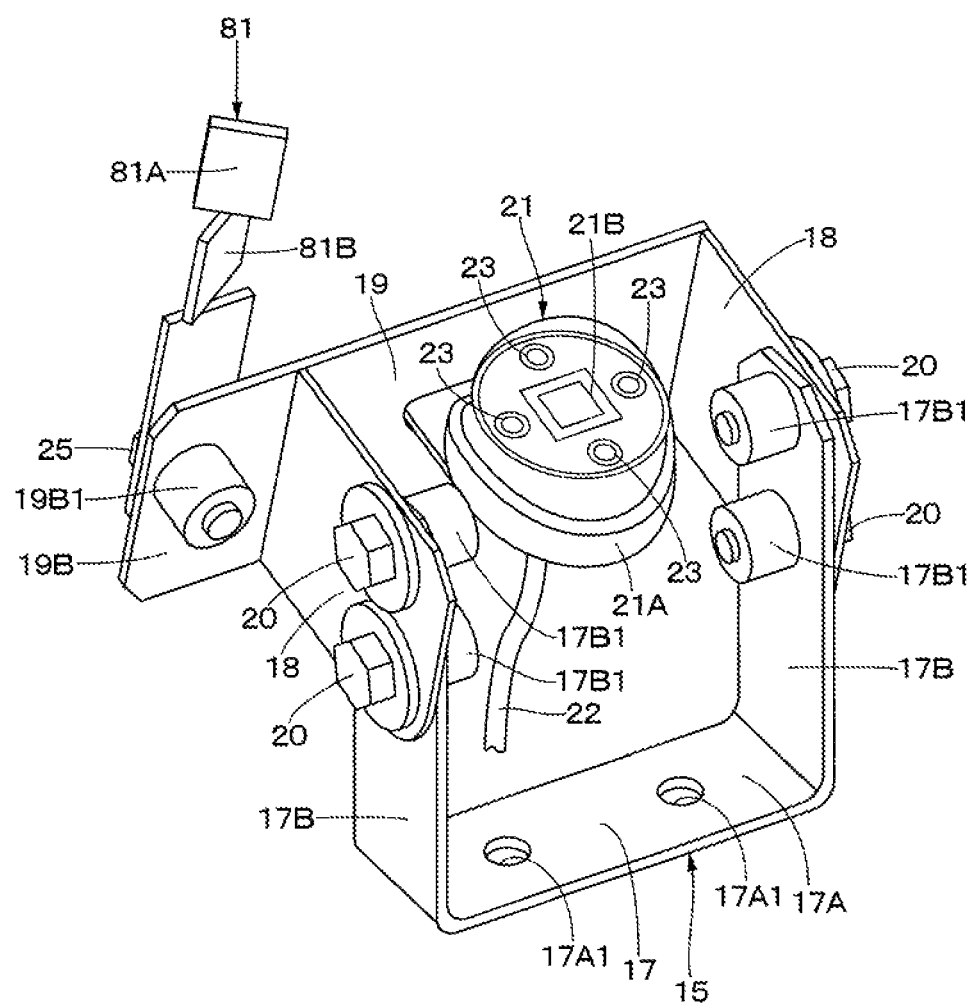
FIG. 20 is a perspective view showing a bracket, an imaging device provided with an illumination device, an upper reference photographic subject, a lower reference photographic subject and the like according to a third modification example of the present invention.

In addition, as in the case of a third modification example as shown in FIG. 20, reference photographic subjects 81 composed of an upper reference photographic subject 81A (a first reference photographic subject) and a lower reference photographic subject 81B (a second reference photographic subject) adjusted in an angle in the upper-lower direction there between such that disturbance of the sunlight or the like is not reflected simultaneously thereon may be arranged on either side in the left-right direction to be shot in positions different from an object in the image area to be shot. In this case, the upper reference photographic subject 81A is inclined toward the left side in the left-right direction, for example, and the lower reference photographic subject 81B is inclined toward the right side in the left-right direction, for example.

Figure 8:
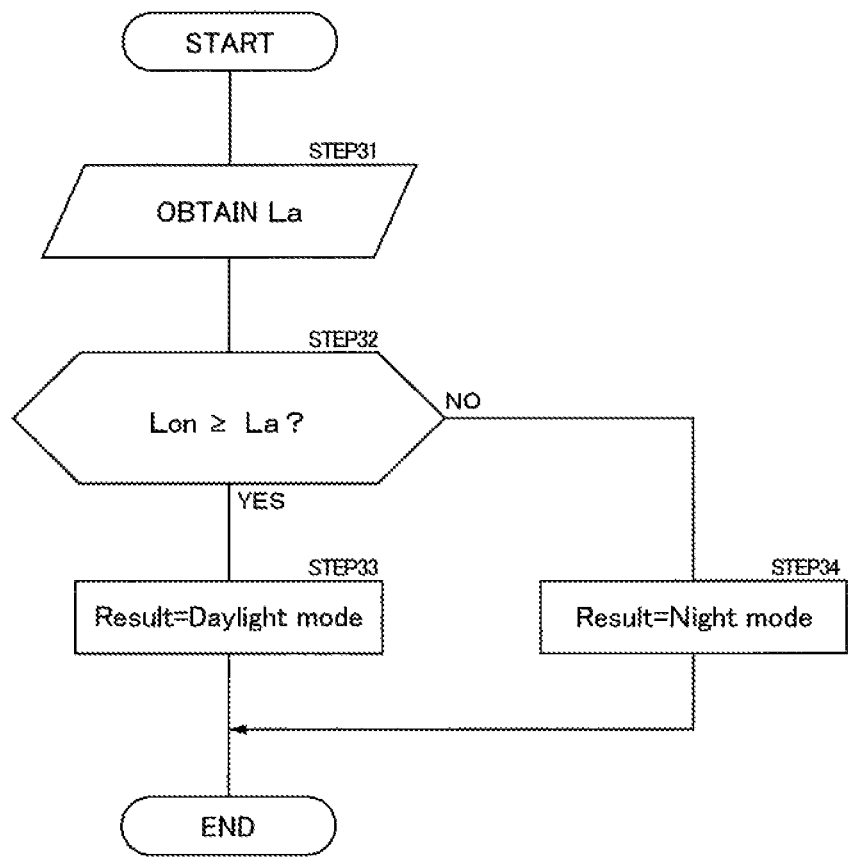
FIG. 8 is a flow chart showing processing of a day or night determination on a night mode according to the first embodiment of the present invention.

In addition, in the aforementioned first embodiment, as shown in FIG. 8, a case where the day or night determination is performed based upon the luminance average value of any reference photographic subject of the left reference photographic subject 24A and the right reference photographic subject 24B in the night mode is explained as an example. However, the present invention is not limited thereto, but, for example, the control processing of the day or night determination in the same way as the daylight mode as shown in FIG. 7 may be executed even in the night mode. That is, the day or night determination may be made based upon the luminance average value as the smaller value of the left luminance average value La and the right luminance average value Lb even in the night mode. Thereby, since the control processing of the day or night determination can be unified to the control processing as shown in FIG. 7 regardless of the previous result (mode) of the day or night determination, it is possible to simplify the control processing of the day or night determination. This can be likewise applied to the daylight mode as shown in FIG. 14 in the second embodiment. Further, this can be likewise applied to the third embodiment.

In addition, in the aforementioned first embodiment, a case of executing the white and black inversion processing to the white and black image 28N1 for night mode in a case where the result of the day or night determination is determined as night is explained. However, the present invention is not limited thereto, but, for example, the white and black inversion processing may be executed to the white and black image 28D1 for daylight mode in a case where the result of the day or night determination is determined as the daylight. This can be likewise applied to the second embodiment and the third embodiment.

In addition, in the aforementioned first embodiment, a case where the two reference photographic subjects 24 composed of the left reference photographic subject 24A (the first reference photographic subject) and the right reference photographic subject 24B (the second reference photographic subject) are disposed is explained as an example. However, the present invention is not limited thereto, but, for example, three or more reference photographic subjects may be disposed. In a case of disposing the three or more reference photographic subjects, the luminance information (the luminance average value) as the smallest value, that is, a reference photographic subject having the smallest luminance average value of the plurality of reference photographic subjects is selected, making it possible to perform the determination of day or night. This can be likewise applied to the second embodiment and the third embodiment.

In addition, in the aforementioned embodiments, a case where the monitor device 11 is mounted on the dump truck 2 to monitor the overhead line 1 and the current collector 10 for driving the dump truck 2 is explained as an example.

However, the present invention is not limited thereto, but besides, the monitor device 11 can be used widely as a monitor device that monitors objects outdoors.

DESCRIPTION OF REFERENCE NUMERALS

1: Overhead line (Object)
2: Dump truck (Vehicle)
3: Vehicle body
9: Pantograph
10: Current collector (Object)
11: Monitor device
21: Imaging device
23: Illumination device
24, 64, 71, 81: Reference photographic subject
24A, 62, 71A: Left reference photographic subject (First reference photographic subject)
24B, 63, 71B: Right reference photographic subject (Second reference photographic subject)
26: Controller
27: Image input section
28D: Day image
28N: Night image
29: Day or night determination processing section
32: Image processing section
51: Illumination determination section
81A: Upper reference photographic subject (First reference photographic subject)
81B: Lower reference photographic subject (Second reference photographic subject)
Lon: Lighting luminance threshold value
Loff: Extinction luminance threshold value

The invention claimed is:

1. A monitor device comprising:
an imaging device that is mounted on a vehicle and shoots an object outside of the vehicle;
a controller that processes an image shot by the imaging device; and
a plurality of reference photographic subjects that are disposed to be fixed integrally with the imaging device and are shot by the imaging device in positions different from the object in an image area to be shot, characterized in that:
wherein the controller includes:
a day or night determination processing section that determines day or night in an imaging environment of the object; and
an image processing section that switches an image processing parameter for recognizing the object in the image by executing image processing different in the daylight and at night based upon the result of the day or night determination determined by the day or night determination processing section, wherein
the day or night determination processing section in the controller performs the determination of day or night based upon luminance information of the plurality of reference photographic subjects, and
the image processing section in the controller executes the image processing using the image processing parameter different in the daylight and at night based upon the result of the day or night determination of the day or night determination processing section.

2. The monitor device according to claim 1, wherein the day or night determination processing section in the controller selects a smallest luminance average value of the plurality of reference photographic subjects disposed to be respectively displayed in different positions in the image shot by the imaging device, and performs the determination of day or night of the imaging environment by comparing this selected smallest luminance average value with a predetermined luminance threshold value.

3. The monitor device according to claim 1, further comprising:
an illumination device that illuminates the object and the plurality of reference photographic subjects that are shot by the imaging device.

4. The monitor device according to claim 3, wherein
the controller includes an illumination determination section that determines lighting and extinction of the illumination device, and
the day or night determination processing section in the controller performs the determination of day or night based upon a lighting luminance threshold value in a case where the determination result of the illumination determination section is the lighting, and performs the determination of day or night based upon an extinction luminance threshold value of a smaller value than the lighting luminance threshold value in a case where the determination result of the illumination determination section is the extinction.

5. The monitor device according to claim 1, wherein the controller further includes an inversion processing section that inversion-outputs luminance of an image to be inputted in a case where the day or night determination processing section determines the imaging environment as night.

6. The monitor device according to claim 1, wherein
the object includes an overhead line stretched on a traveling path of the vehicle, and a current collector that makes sliding contact with the overhead line to take in power for driving the vehicle, and
the imaging device is mounted on the vehicle to be provided with a camera that shoots the overhead line and the current collector to be included within an imaging range.

7. A trolley type vehicle comprising:
a vehicle body;
a pantograph that is disposed in the vehicle body and is capable of moving up and down; and
a current collector that makes sliding contact with an overhead line stretched to face the pantograph to take in power,
wherein the vehicle body being provided with a monitor device including:
an imaging device that shoots the overhead line and the current collector; and
a controller that processes an image shot by the imaging device, and
the controller including:
a day or night determination processing section that determines day or night of an imaging environment of the overhead line and the current collector shot by the imaging device; and
an image processing section that switches an image processing parameter for recognizing the overhead line and the current collector in the image by executing image processing different in the daylight and at night based upon the result of the day or night determination determined by the day or night determination processing section, characterized in that:
the vehicle body is provided with a plurality of reference photographic subjects to be shot by the imaging device in positions different from the overhead line and the current collector in an image area to be shot;

the day or night determination processing section in the controller performs determination of day or night based upon luminance information of the plurality of reference photographic subjects; and the image processing section in the controller executes the image processing using the image processing parameter different in the daylight and at night based upon the result of the day or night determination of the day or night determination processing section.

* * * * *